(12) United States Patent
Sato et al.

(10) Patent No.: US 11,600,426 B2
(45) Date of Patent: Mar. 7, 2023

(54) DC-DC CONVERTER MULTILAYER COIL ARRAY AND DC-DC CONVERTER

(71) Applicant: Murata Manufacturing Co., Ltd., Kyoto-fu (JP)

(72) Inventors: Mitsuhiro Sato, Nagaokakyo (JP); Ryohei Kawabata, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/592,582

(22) Filed: Oct. 3, 2019

(65) Prior Publication Data
US 2020/0111598 A1 Apr. 9, 2020

(30) Foreign Application Priority Data
Oct. 5, 2018 (JP) .............................. JP2018-190200

(51) Int. Cl.
*H01F 27/28* (2006.01)
*H02M 3/158* (2006.01)
(Continued)

(52) U.S. Cl.
CPC ......... *H01F 27/2804* (2013.01); *H01F 27/24* (2013.01); *H01F 27/29* (2013.01);
(Continued)

(58) Field of Classification Search
CPC .... H02M 1/08; H02M 3/1584; H02M 3/1586; H02M 1/0064; H01F 17/0013;
(Continued)

(56) References Cited

U.S. PATENT DOCUMENTS

| | | | |
|---|---|---|---|
| 2011/0286144 A1* | 11/2011 | Ikriannikov | H01F 27/292 361/268 |
| 2016/0078997 A1* | 3/2016 | Son | H01F 17/0033 174/260 |

(Continued)

FOREIGN PATENT DOCUMENTS

| | | |
|---|---|---|
| CN | 101911221 A | 12/2010 |
| JP | 2001-110638 A | 4/2001 |

(Continued)

OTHER PUBLICATIONS

An Office Action; "Notice of Reasons for Refusal," mailed by the Japanese Patent Office dated Mar. 23, 2021, which corresponds to Japanese Patent Application No. 2018-190195 and is related to U.S. Appl. No. 16/592,582 with English language translation.

*Primary Examiner* — Fred E Finch, III
(74) *Attorney, Agent, or Firm* — Studebaker & Brackett PC

(57) ABSTRACT

A multilayer coil array includes an element body; first and second built-in coils; and first to fourth outer electrodes provided on the element body. A non-magnetic layer is provided between the first and second coils. An end of the first coil extending from the coil conductor closest to the second coil among the plurality of coil conductors of the first coil is connected to the first outer electrode and another end of the first coil is connected to the second outer electrode. An end of the second coil extending from the coil conductor closest to the first coil among the plurality of coil conductors of the second coil is connected to the third outer electrode and another end portion of the second coil is connected to the fourth outer electrode. The second and fourth outer electrodes are connected to output terminals of a switching element of a DC-DC converter.

15 Claims, 13 Drawing Sheets

(51) Int. Cl.
  *H01F 27/24* (2006.01)
  *H01F 27/29* (2006.01)
  *H02M 1/00* (2006.01)

(52) U.S. Cl.
  CPC ..... *H02M 3/158* (2013.01); *H01F 2027/2809* (2013.01); *H02M 1/0064* (2021.05); *H02M 3/1584* (2013.01)

(58) Field of Classification Search
  CPC .. H01F 17/04; H01F 2017/0066; H01F 27/24; H01F 27/255; H01F 27/2804; H01F 2027/2809; H01F 27/29; H01F 27/292; H01F 27/324
  See application file for complete search history.

(56) References Cited

U.S. PATENT DOCUMENTS

| | | | |
|---|---|---|---|
| 2016/0099102 A1 | 4/2016 | Matsunaga | |
| 2017/0092414 A1 | 3/2017 | Ishikawa et al. | |
| 2017/0345551 A1* | 11/2017 | Yoshioka | H01F 17/0013 |
| 2018/0033536 A1* | 2/2018 | Nishi | H01F 27/08 |
| 2018/0061561 A1* | 3/2018 | Sim | H01F 27/36 |
| 2018/0286558 A1 | 10/2018 | Yokoyama et al. | |
| 2020/0027653 A1* | 1/2020 | Terauchi | H01F 27/2804 |
| 2020/0111609 A1* | 4/2020 | Sato | H01F 27/2847 |
| 2020/0211767 A1* | 7/2020 | Hou | H01F 27/24 |

FOREIGN PATENT DOCUMENTS

| | | | |
|---|---|---|---|
| JP | 2005-129793 A | | 5/2005 |
| JP | 2006-351954 A | | 12/2006 |
| JP | 2007-281315 A | | 10/2007 |
| JP | 2012-160506 A | | 8/2012 |
| JP | 2013-098187 A | | 5/2013 |
| JP | 2015073052 A | * | 4/2015 |
| JP | 2015073052 A | | 4/2015 |
| JP | 2016-186963 A | | 10/2016 |
| WO | 2017/141681 A1 | | 8/2017 |

* cited by examiner

DC-DC CONVERTER MULTILAYER COIL ARRAY AND DC-DC CONVERTER

CROSS-REFERENCE TO RELATED APPLICATION

This application claims benefit of priority to Japanese Patent Application No. 2018-190200, filed Oct. 5, 2018, the entire content of which is incorporated herein by reference.

BACKGROUND

Technical Field

The present disclosure relates to a DC-DC converter multilayer coil array and a DC-DC converter.

Background Art

Japanese Unexamined Patent Application Publication No. 2016-186963 discloses a coil component of the related art. That is, Japanese Unexamined Patent Application Publication No. 2016-186963 discloses a multilayer electronic component in which magnetic layers and conductor patterns are stacked on top of one another and a coil is formed inside the resulting multilayer body by connecting the conductor patterns between the magnetic layers. The magnetic layers are formed of a metal magnetic material. At least one extending conductor pattern of the coil is connected to an outer terminal formed on a bottom surface of the multilayer body by a conductor formed at a corner of the multilayer body.

A multilayer electronic component having a built-in coil can be used as a coil component of a DC-DC converter that converts an alternating-current voltage into a direct-current voltage and outputs a prescribed voltage. A multilayer coil array having a plurality of built-in coils can be used as a coil component of a DC-DC converter.

However, a potential difference generated between two coils in a small-sized surface-mount coil array component may be problem and there is a demand for this potential difference to be reduced. In particular, there is a risk of a short circuit being generated between adjacent coil conductors when the potential difference between the coil conductors is large.

SUMMARY

Accordingly, the present disclosure provides a DC-DC converter multilayer coil array that can reduce a potential difference between adjacent coil conductors and can suppress the generation of a short circuit between adjacent coil conductors and to provide a DC-DC converter.

The inventors of the present disclosure found that, in a multilayer coil array in which a first coil and a second coil are built into an element body, a potential difference between adjacent coil conductors could be reduced and a short circuit between adjacent coil conductors could be suppressed by connecting an end portion of the first coil that extends from the coil conductor that is closest to the second coil among the plurality of coil conductors of the first coil and an end portion of the second coil that extends from the coil conductor that is closest to the first coil among the plurality of coil conductors of the second coil to a capacitor of a DC-DC converter. This finding led to realization of the disclosure of the present application.

A first embodiment of the present disclosure provides a DC-DC converter multilayer coil array that includes an element body that includes a magnetic layer containing magnetic particles; a first coil and a second coil that are built into the element body; and a first outer electrode, a second outer electrode, a third outer electrode, and a fourth outer electrode that are provided on a surface of the element body and are respectively electrically connected to end portions of the first coil and the second coil. A non-magnetic layer is provided between the first coil and the second coil. The first coil and the second coil are each formed by a plurality of coil conductors being connected to each other in a stacking direction. An end portion of the first coil that extends from the coil conductor that is closest to the second coil among the plurality of coil conductors of the first coil is connected to the first outer electrode and another end portion of the first coil is connected to the second outer electrode. An end portion of the second coil that extends from the coil conductor that is closest to the first coil among the plurality of coil conductors of the second coil is connected to the third outer electrode and another end portion of the second coil is connected to the fourth outer electrode. The second outer electrode and the fourth outer electrode are configured to be connected to output terminals of a switching element of a DC-DC converter.

A second embodiment of the present disclosure provides a DC-DC converter that includes the multilayer coil array according to the first embodiment; a switching element; and a capacitor. The second outer electrode and the fourth outer electrode are connected to output terminals of the switching element. The first outer electrode and the third outer electrode are connected to the capacitor of the DC-DC converter.

The DC-DC converter multilayer coil array according to the first embodiment of the present disclosure is capable of reducing a potential difference between adjacent coil conductors and is capable of suppressing a short circuit between adjacent coil conductors as a result of the multilayer coil array having the above-described features. In addition, the DC-DC converter according to the second embodiment of the present disclosure is capable of reducing a potential difference between adjacent coil conductors and is capable of suppressing a short circuit between adjacent coil conductors as a result of the DC-DC converter having the above-described features.

Other features, elements, characteristics and advantages of the present disclosure will become more apparent from the following detailed description of preferred embodiments of the present disclosure with reference to the attached drawings.

DETAILED DESCRIPTION

Figure 1A:
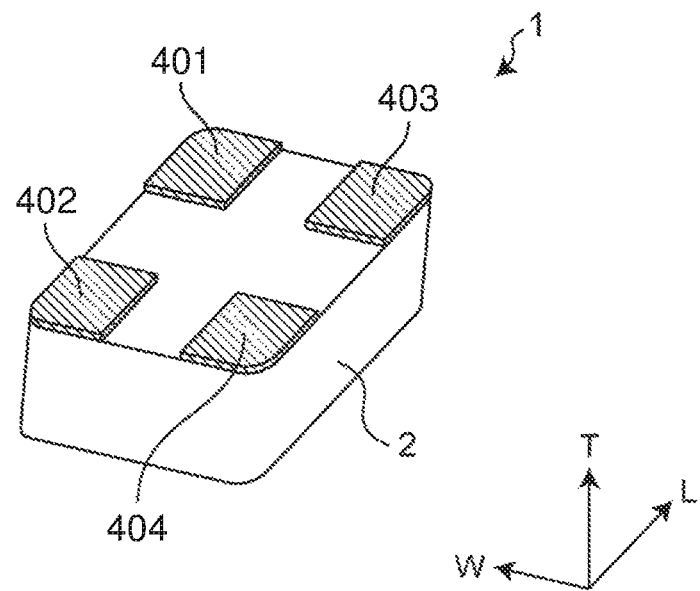
FIG. 1A is a perspective view seen from a bottom surface side of a multilayer coil array according to an embodiment of the present disclosure.

Hereafter, a multilayer coil array according to an embodiment of the present disclosure will be described in detail while referring to the drawings. The embodiment described hereafter is for illustrative purposes and the present disclosure is not limited to the embodiment described hereafter. Unless specifically stated otherwise, it is not intended that scope of the present disclosure be limited to the dimensions, materials, shapes, relative arrangements, and so forth of constituent components described hereafter and these are merely explanatory examples. In addition, the sizes, shapes, positional relationships, and so forth of the constituent elements illustrated in the drawings may be exaggerated for the sake of clear explanation.

Figure 1B:
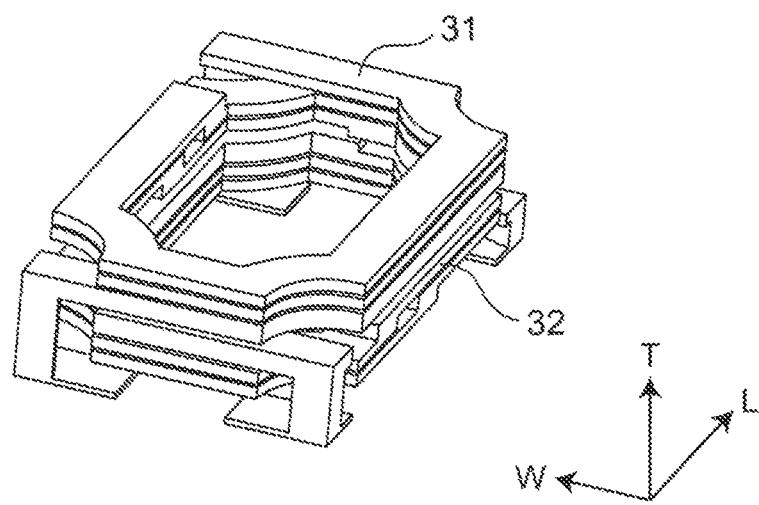
FIG. 1B is a perspective view that schematically illustrates the shapes of coils provided inside the multilayer coil array according to the embodiment of the present disclosure.
Figure 1C:
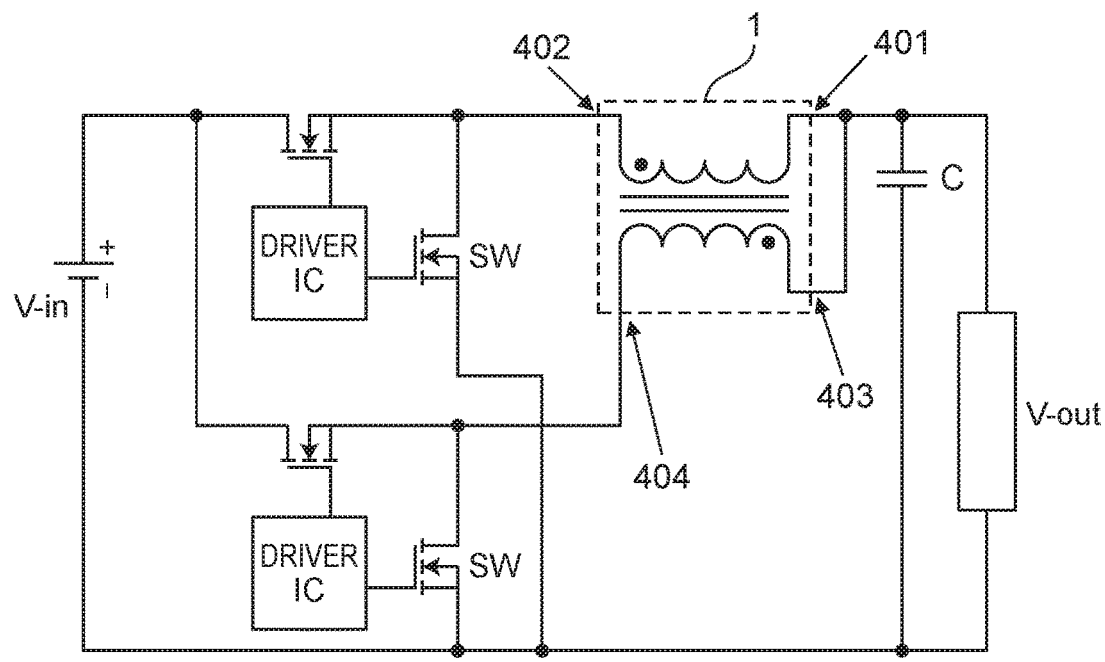
FIG. 1C is a schematic diagram illustrating an example of a DC-DC converter including the multilayer coil array according to the embodiment of the present disclosure.

A multilayer coil array 1 according to an embodiment of the present disclosure is illustrated in FIGS. 1A and 1B. FIG. 1A is a perspective view in which the multilayer coil array 1 of the embodiment of the present disclosure is seem from the bottom surface side and FIG. 1B is a perspective view that schematically illustrates the shapes of a first coil 31 and a second coil 32, which are provided inside the multilayer coil array 1. The multilayer coil array 1 according to this embodiment includes an element body 2 that includes a magnetic layer containing magnetic particles; the first coil 31 and the second coil 32, which are built into the element body 2; and a first outer electrode 401, a second outer electrode 402, a third outer electrode 403, and a fourth outer electrode 404 that are provided on a surface of the element body 2 and are respectively electrically connected to end portions of the first coil 31 and the second coil 32. In the present specification, the lengths, widths, and thicknesses (heights) of the multilayer coil array 1 and the element body 2 may be denoted as "L", "W", and "T", respectively (refer to FIGS. 1A and 1B). In addition, in the present specification, a direction parallel to the length L of the element body 2 may be referred to as an "L direction", a direction parallel to the width W of the element body 2 may be referred to as a "W direction", a direction parallel to the thickness direction T of the element body 2 may be referred to as a "T direction", a plane parallel to the L direction and the T direction may be referred to as an "LT plane", a plane parallel to the W direction and the T direction may be referred to as a "WT plane", and a plane parallel to the L direction and the W direction may be referred to as an "LW plane". Also, FIG. 1C illustrates an example of a DC-DC converter including the multilayer coil array 1, at least one switching element SW, and a capacitor C.

The size of the multilayer coil array 1 according to this embodiment is not particularly limited, but the length (L) is preferably 1.45-2.7 mm, the width (W) is preferably 0.65-2.2 mm, and the height (T) is preferably 0.45-1.2 mm.

Figure 3A:
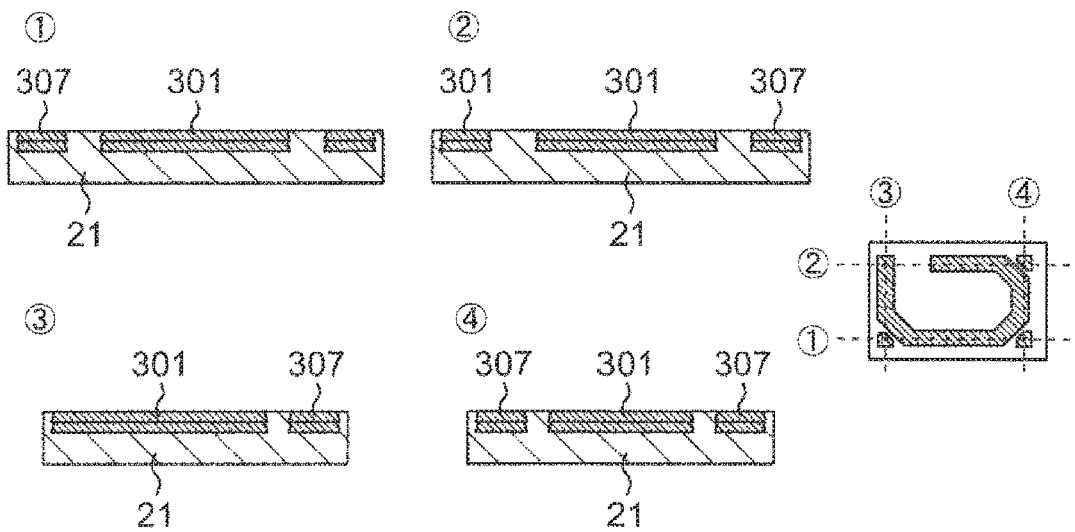
FIG. 3A is a schematic diagram for describing a method of manufacturing the multilayer coil array according to the embodiment of the present disclosure.
Figure 3B:
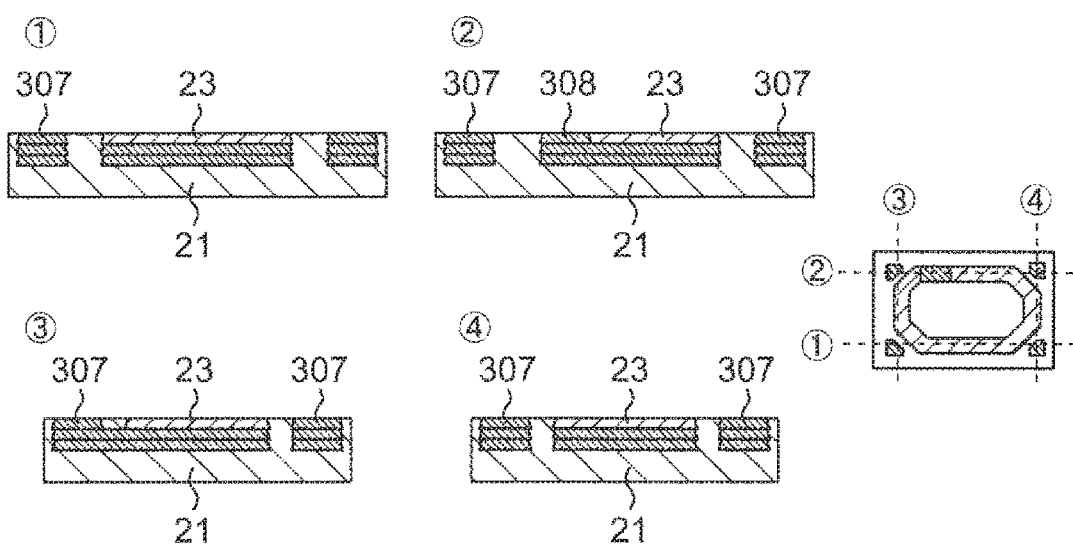
FIG. 3B is a schematic diagram for describing the method of manufacturing the multilayer coil array according to the embodiment of the present disclosure.
Figure 3C:
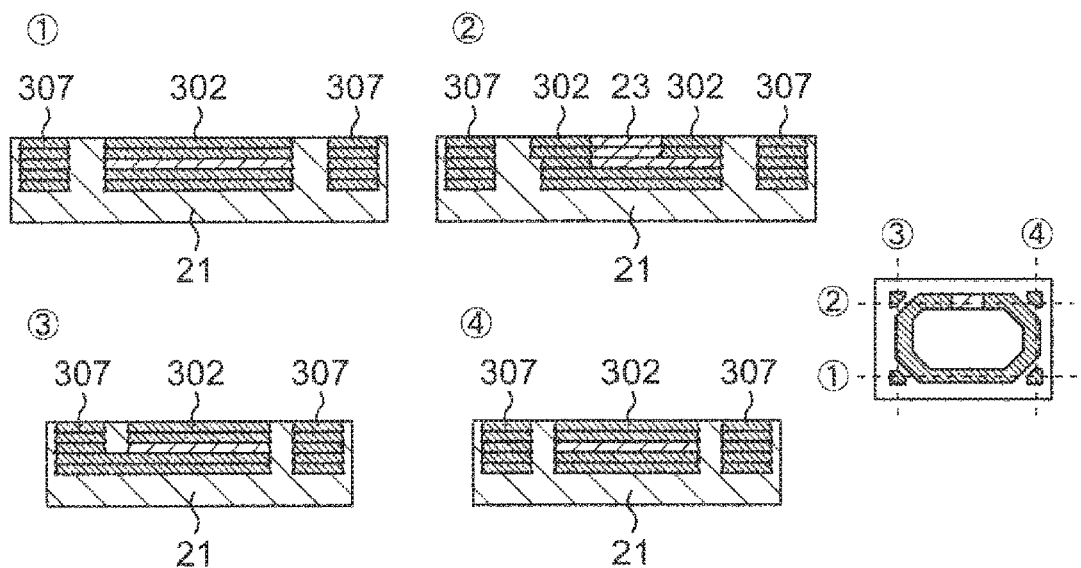
FIG. 3C is a schematic diagram for describing the method of manufacturing the multilayer coil array according to the embodiment of the present disclosure.
Figure 3D:
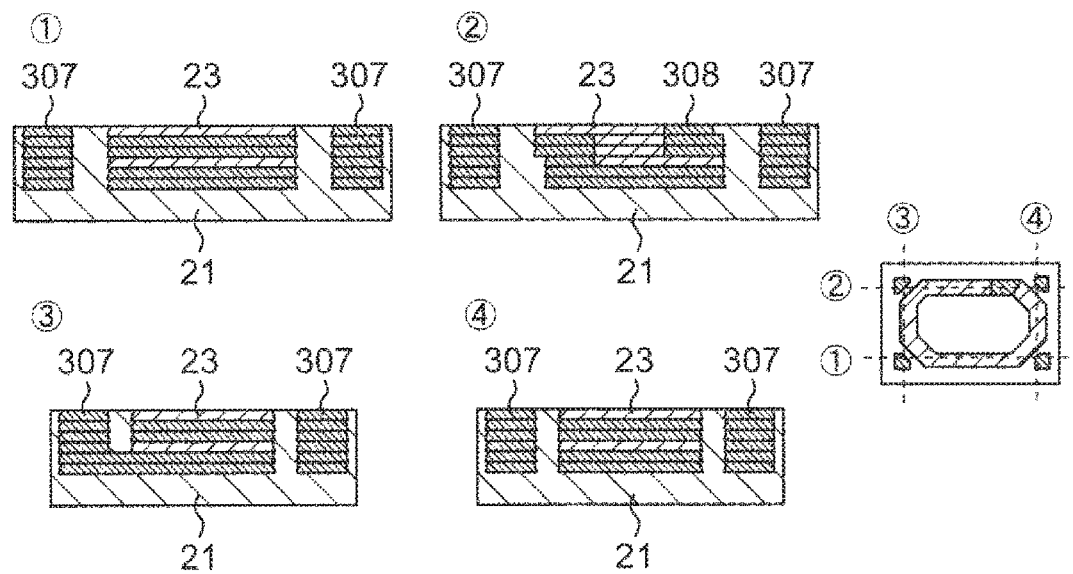
FIG. 3D is a schematic diagram for explaining the method of manufacturing the multilayer coil array according to the embodiment of the present disclosure.
Figure 3E:
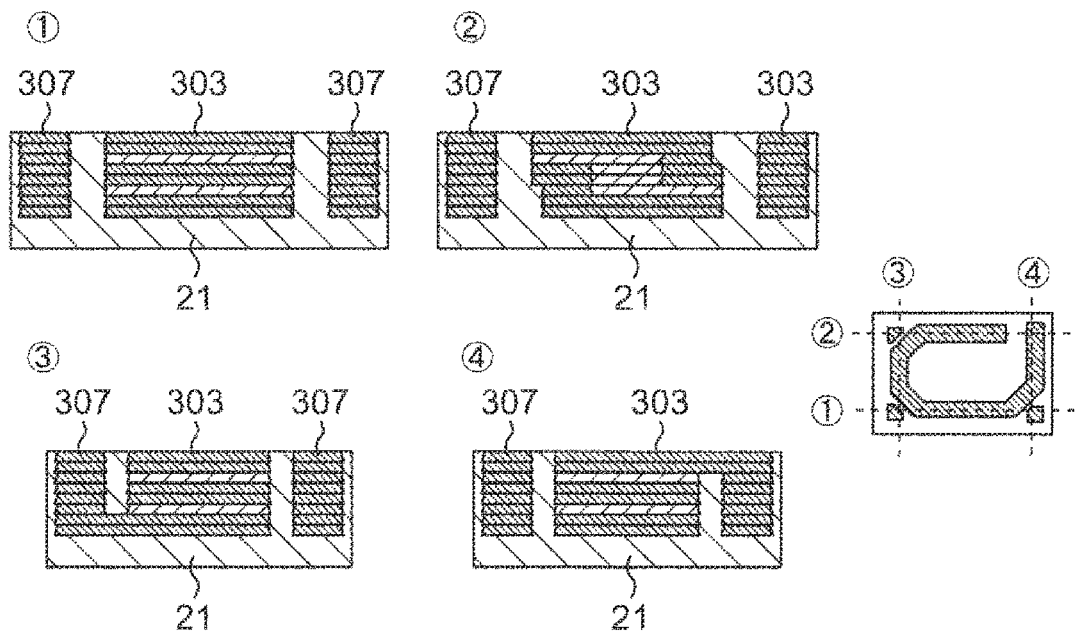
FIG. 3E is a schematic diagram for describing the method of manufacturing the multilayer coil array according to the embodiment of the present disclosure.
Figure 3F:
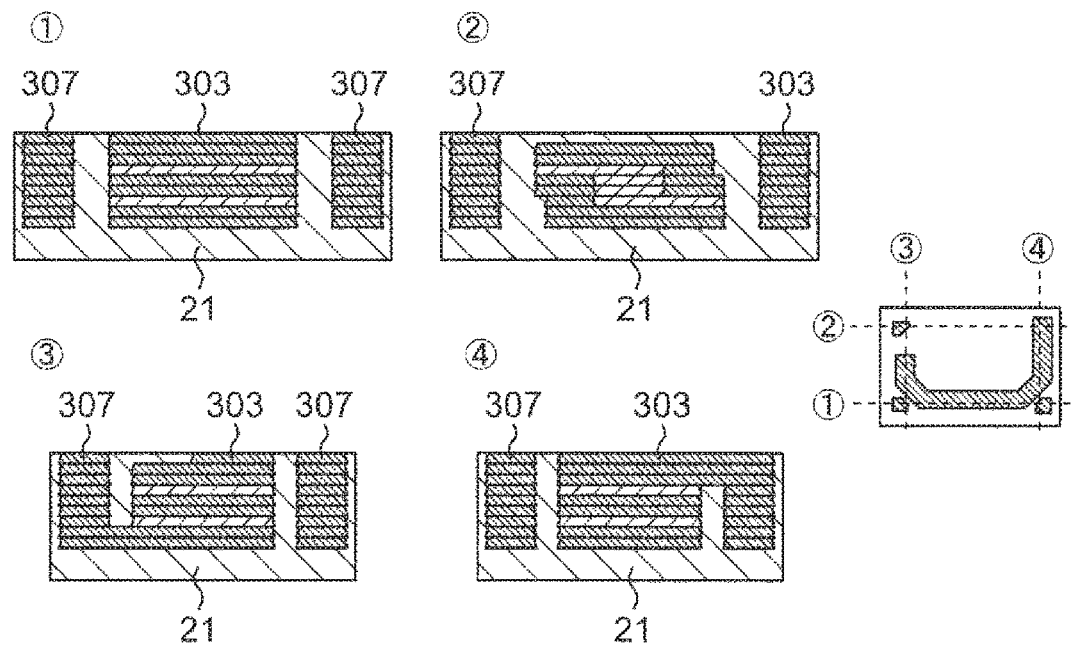
FIG. 3F is a schematic diagram for describing the method of manufacturing the multilayer coil array according to the embodiment of the present disclosure.
Figure 3G:
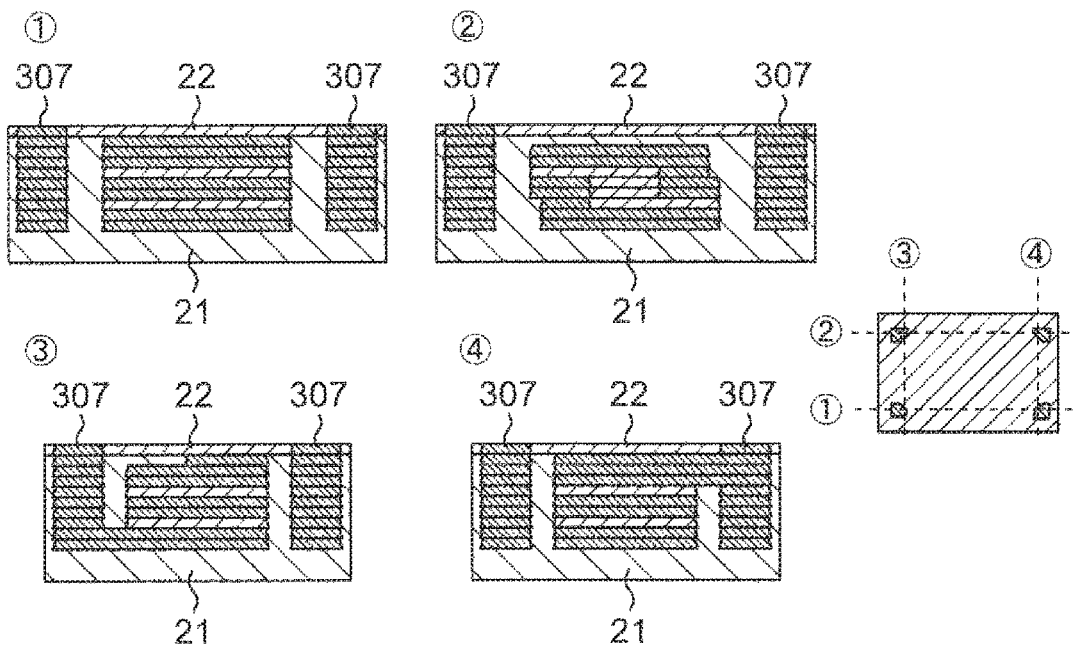
FIG. 3G is a schematic diagram for describing the method of manufacturing the multilayer coil array according to the embodiment of the present disclosure.

The element body 2 of the multilayer coil array 1 according to this embodiment includes a magnetic layer 21 and a non-magnetic layer 22 (See, FIG. 3G). The element body 2 may also include a non-magnetic portion 23 (See, FIGS. 3B-3D and 3J-3L) which is described later, in addition to the non-magnetic layer 22.

Magnetic Layer 21

The magnetic layer 21 contains magnetic particles formed of a magnetic material. The magnetic particles may be particles composed of a metal magnetic material (metal magnetic particles) such as Fe, Co, Ni or an alloy including any of these metals, or may be ferrite particles. The magnetic particles are preferably Fe particles or Fe alloy particles. Preferred Fe alloys include Fe—Si alloys, Fe—Si—Cr alloys, Fe—Si—Al alloys, Fe—Si—B—P—Cu—C alloys, and Fe—Si—B—Nb—Cu alloys. It is preferable that the surfaces of the metal magnetic particles composed of a metal magnetic material described above be covered with an insulating film. The degree of insulation between the metal magnetic particles can be increased when the surfaces of the metal magnetic particles are covered with an insulating film. The method used to form the insulating film on the surfaces of the metal magnetic particles will be described later. The material forming the insulating film is preferably an oxide of P, Si, or the like. Furthermore, the insulating film may be an oxide film formed by oxidizing the surfaces of the metal magnetic particles. The thickness of the insulating film is preferably 1-50 nm, more preferably 1-30 nm, and still more preferably 1-20 nm. As described later, the thickness of the insulating film may be obtained by capturing an image using a scanning electron microscope (SEM) of a cross section obtained by grinding a multilayer coil array test piece and measuring the thickness of the insulating film on the surfaces of the metal magnetic particles from the obtained SEM image.

The average particle diameter of the metal magnetic particles in the magnetic layer 21 is preferably 1-30 μm, more preferably 1-20 μm, and still more preferably 1-10 μm. The average particle diameter of the metal magnetic particles in the magnetic layer 21 can be measured using the procedure described below. Images of a cross section obtained by cutting a test piece of the multilayer coil array 1 are captured at a plurality of (for example, five) regions (for example, 130 μm×100 μm) using an SEM, the obtained SEM images are analyzed using image analysis software (for example, A Zou Kun (Registered Trademark) produced by Asahi Kasei Engineering Corporation), and the equivalent circle diameters of the metal particles are obtained. The average value of the obtained equivalent circle diameter is obtained as the average value of the metal magnetic particles.

Non-Magnetic Layer

The element body 2 of the multilayer coil array 1 according to this embodiment includes the non-magnetic layer 22 in addition to the magnetic layer 21. As described later, the non-magnetic layer 22 is provided between the first coil 31 and the second coil 32. As a result of providing the non-magnetic layer 22, the degree of insulation between the first coil 31 and the second coil 32 can be increased and the generation of a short circuit between the first coil 31 and the second coil 32 can be suppressed. The non-magnetic layer 22 may include a glass ceramic material, a non-magnetic ferrite material, and so on as a non-magnetic material. The non-magnetic layer 22 preferably includes non-magnetic ferrite as a non-magnetic material. A non-magnetic ferrite material having a composition that contains 40-49.5 mol % of Fe in the form of $Fe_2O_3$, 6-12 mol % of Cu in the form of CuO, with the remainder consisting of ZnO can be used as the non-magnetic ferrite material. $Mn_3O_4$, $Co_3O_4$, $SnO_2$, $Bi_2O_3$, $SiO_2$, and so on may be added to the non-magnetic material as necessary as additives and the non-magnetic material may also contain trace amounts of unavoidable impurities. The non-magnetic layer 22 preferably contains a Zn—Cu ferrite.

The thickness of the non-magnetic layer 22 can be measured using the procedure described below. A multilayer coil array test piece is stood up vertically, the region surrounding the test piece is filled with resin, and the resin is solidified. At this time, the LT plane is exposed. The grinding performed with the grinding machine is terminated at depth of around ½ the dimension of the test piece in the W direction of the test piece and a cross section parallel to the LT plane is exposed. After termination of the grinding, the ground surface is processed using ion milling (Ion Milling Apparatus IM4000 manufactured by Hitachi High-Technologies Corp.) in order to remove burrs produced by the grinding from the inner conductors. An image of a portion substantially in the center of an additional non-magnetic layer in the ground test piece is captured using a scanning electron microscope (SEM), the thickness of the portion substantially in the center of the additional non-magnetic layer is measured from the obtained SEM image, and the measured value is taken as the thickness of the additional non-magnetic layer.

In the multilayer coil array 1, as will be described later, it is preferable that a non-magnetic portion 23 be provided in at least one place between adjacent coil conductors among the plurality of coil conductors of the first coil 31 (first to third coil conductors) and the plurality of coil conductors of the second coil 32 (fourth to sixth coil conductors). Leakage of magnetic flux can be prevented by providing the non-magnetic portion 23.

It is preferable that the non-magnetic layer 22 and the non-magnetic portion 23 have the same composition. For example, it is preferable that the non-magnetic layer 22 and the non-magnetic portion 23 be formed of a Zn—Cu ferrite.

Coil

The first coil 31 and the second coil 32 are provided inside the element body 2. As will be described later, the first coil 31 and the second coil 32 are each formed as a result of a plurality of coil conductors being connected to each other in the stacking direction. The first coil 31 and the second coil 32 may be formed of an electrically conductive material such as Ag. An electrically conductive paste may include a solvent, a resin, a dispersant, and so forth in addition to the electrically conductive material. The multilayer coil array 1 according to this embodiment includes two coils that are built into the element body 2 (refer to FIG. 1B and FIGS. 3A to 3S), but a multilayer coil array according to an embodiment of the present disclosure is not limited to this configuration and may instead include three or more coils. Furthermore, in the configuration illustrated in FIG. 1B and FIGS. 3A to 3S, the first coil 31 and the second coil 32 are each formed as a result of three coil conductors being connected to each other. However, the multilayer coil array 1 according to this embodiment is not limited to this configuration, and the multilayer coil array 1 may instead include coils formed by two coil conductors or four or more coil conductors being connected to each other depending on the desired inductance value of the coil and so forth.

Figure 3H:
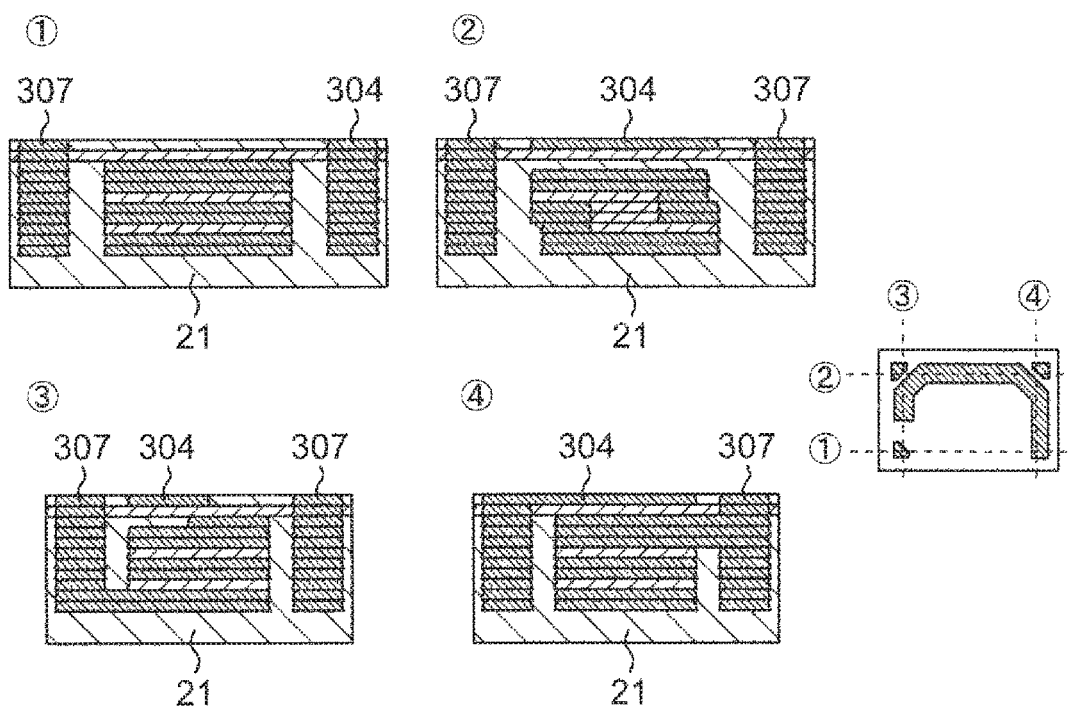
FIG. 3H is a schematic diagram for describing the method of manufacturing the multilayer coil array according to the embodiment of the present disclosure.
Figure 3I:
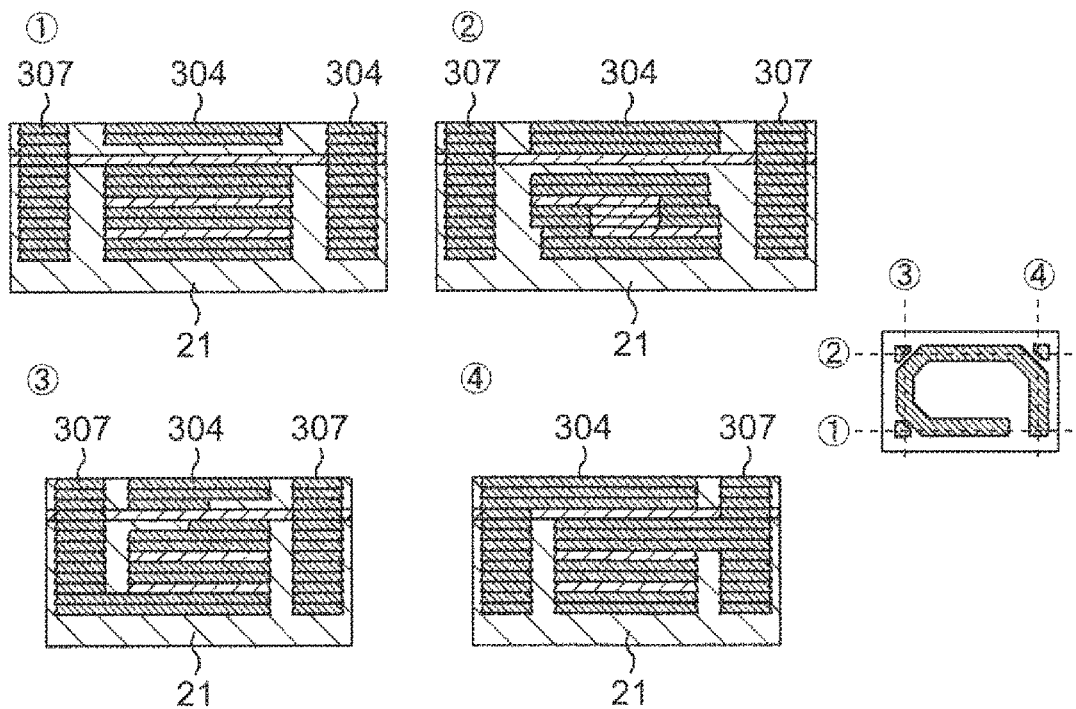
FIG. 3I is a schematic diagram for describing the method of manufacturing the multilayer coil array according to the embodiment of the present disclosure.
Figure 3J:
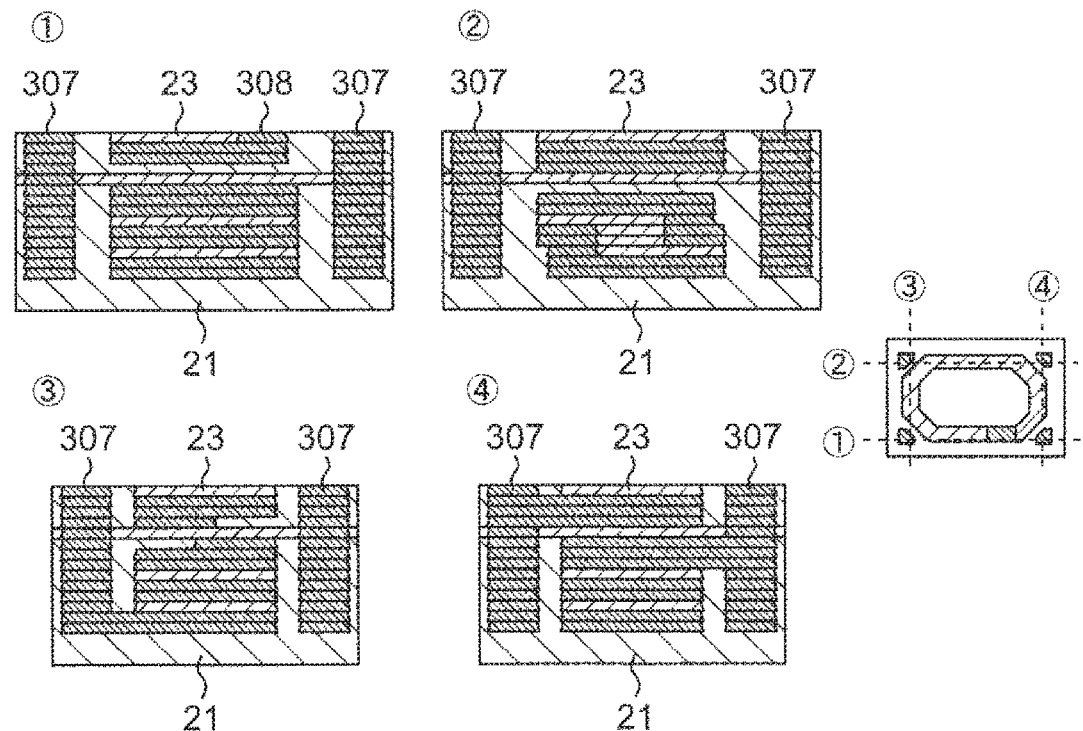
FIG. 3J is a schematic diagram for describing the method of manufacturing the multilayer coil array according to the embodiment of the present disclosure.
Figure 3K:
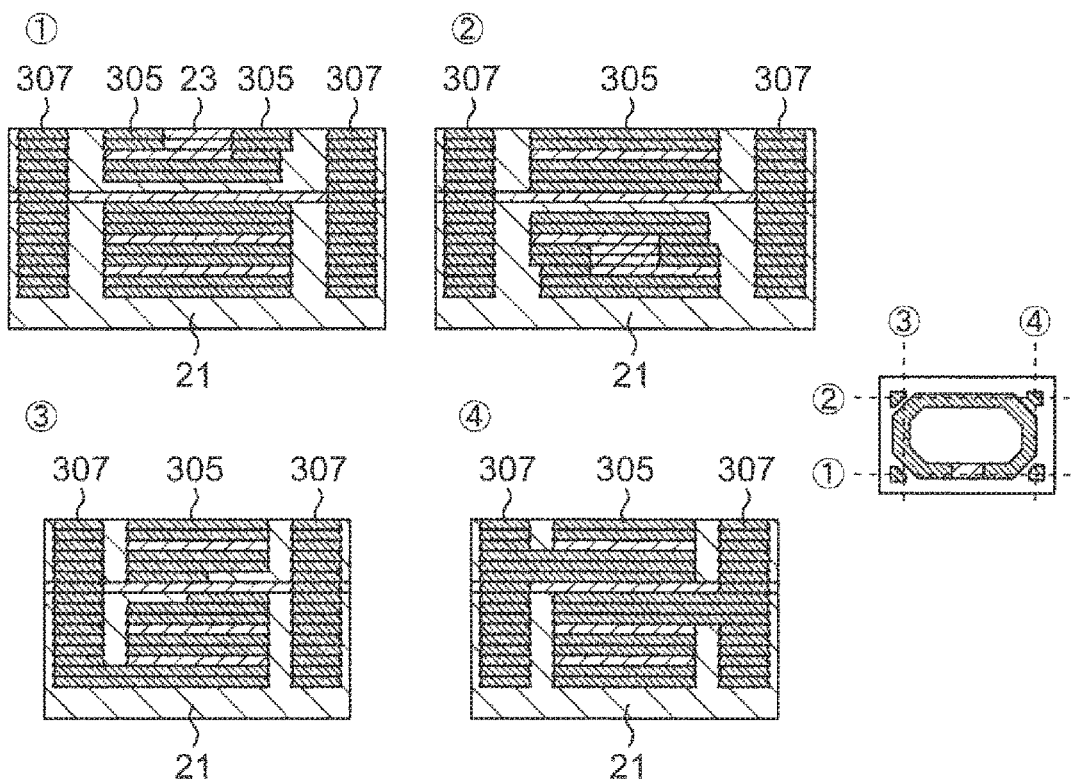
FIG. 3K is a schematic diagram for describing the method of manufacturing the multilayer coil array according to the embodiment of the present disclosure.
Figure 3L:
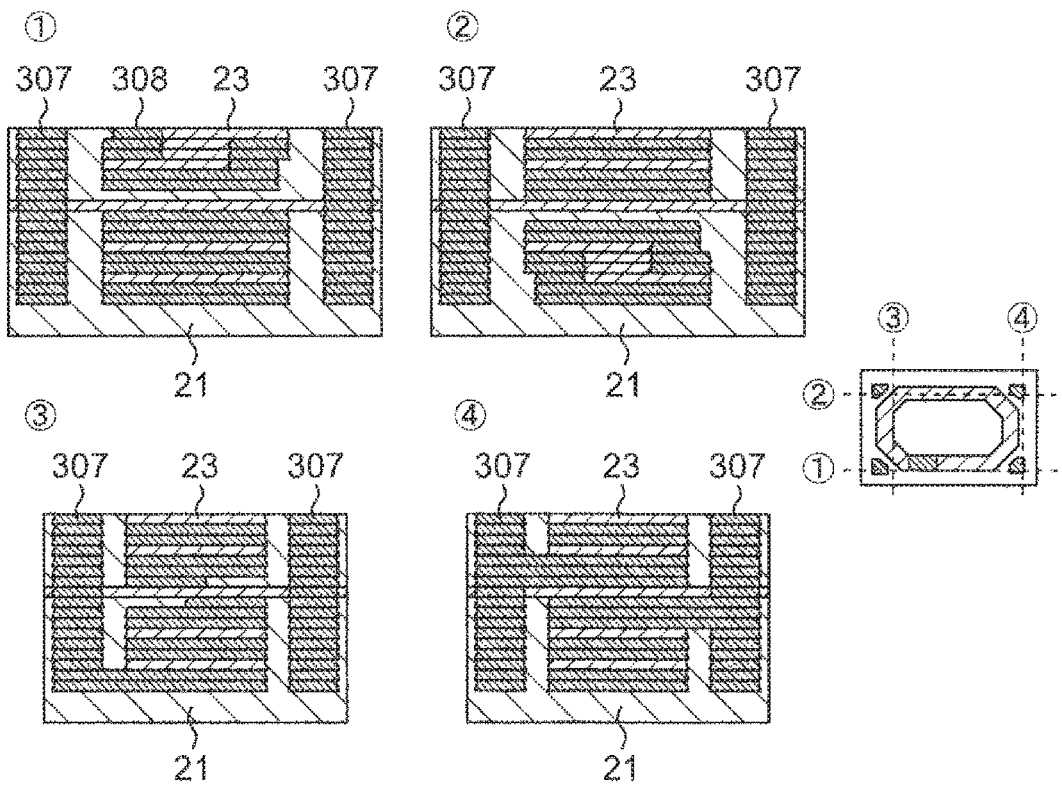
FIG. 3L is a schematic diagram for describing the method of manufacturing the multilayer coil array according to the embodiment of the present disclosure.
Figure 3M:
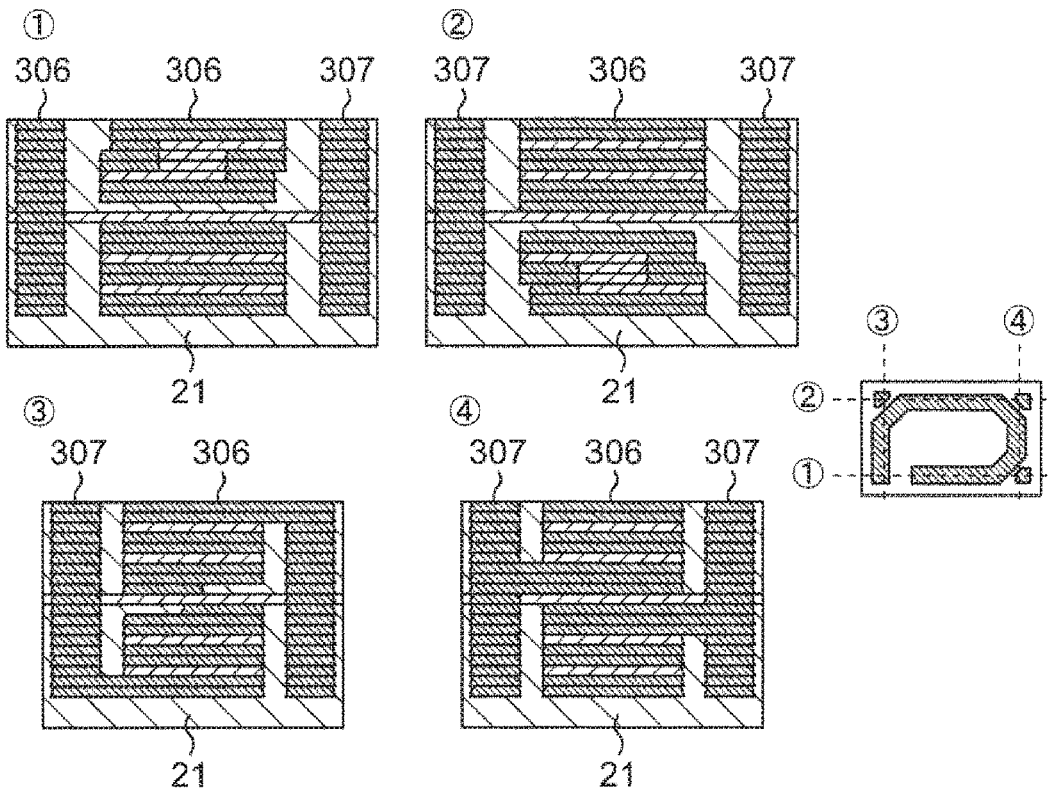
FIG. 3M is a schematic diagram for describing the method of manufacturing the multilayer coil array according to the embodiment of the present disclosure.
Figure 3N:
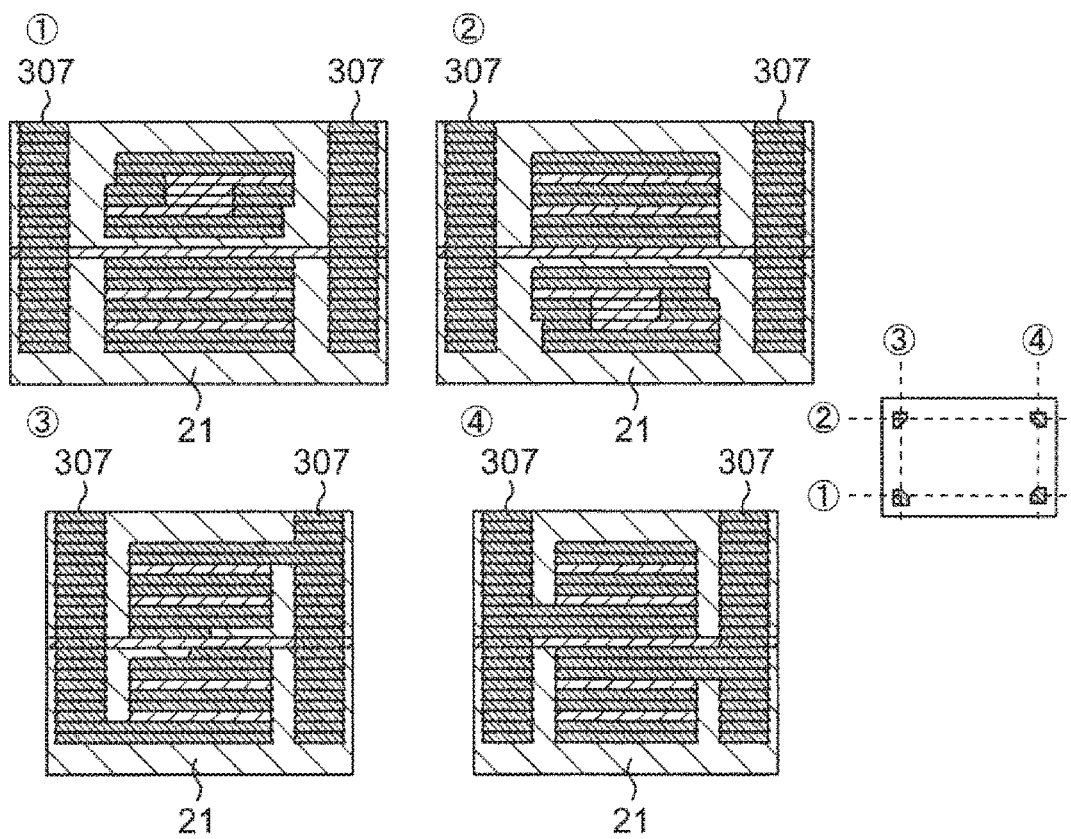
FIG. 3N is a schematic diagram for describing the method of manufacturing the multilayer coil array according to the embodiment of the present disclosure.
Figure 3O:
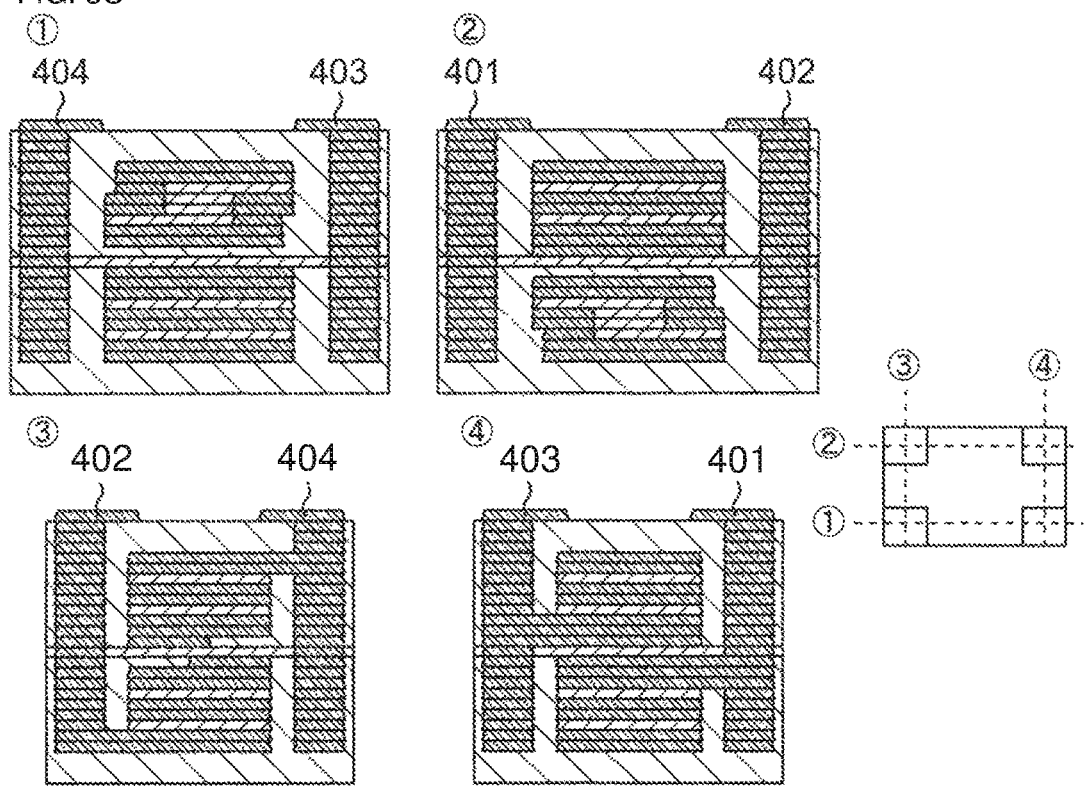
FIG. 3O is a schematic diagram for describing the method of manufacturing the multilayer coil array according to the embodiment of the present disclosure.

In the multilayer coil array 1 according to this embodiment, an end portion of the first coil 31 that extends from the coil conductor that is closest to the second coil 32 among the plurality of coil conductors of the first coil 31 is connected to the first outer electrode 401 and the other end portion of the first coil 31 is connected to the second outer electrode 402 (refer to FIG. 3Q described later). On the other hand, an end portion of the second coil 32 that extends from the coil conductor that is closest to the first coil 31 among the plurality of coil conductors of the second coil 32 is connected to the third outer electrode 403 and the other end portion of the second coil 32 is connected to the fourth outer electrode 404. The second outer electrode 402 and the fourth outer electrode 404 are connected to output terminals of a switching element of a DC-DC converter. The first outer electrode 401 and the third outer electrode 403 are connected to a capacitor of a DC-DC converter. The outer electrodes of the multilayer coil array at the side of capacitor of the DC-DC converter are usually connected to the same line. Therefore, the potential difference between the adjacent coil conductors of two coils can be reduced and the generation of short circuits between the adjacent coil conductors can be suppressed by connecting the adjacent coil conductors of the two coils to the capacitor of the DC-DC converter in this way.

The end portions of the first coil 31 and the second coil 32 are preferably electrically connected to the outer electrodes via connection portions that are provided outside the wound parts of the coils. By providing connection portions in this way, the parasitic capacitances of the multilayer coil array can be reduced, and therefore the resonant frequency can be increased.

In the multilayer coil array 1 according to this embodiment, at least one out of the coil conductor of the first coil 31 that is closest to the second coil 32 among the plurality of coil conductors of the first coil 31 and the coil conductor of the second coil that is closest to the first coil 31 among the plurality of coil conductors of the second coil contacts the non-magnetic layer 22. With this configuration, the degree of insulation between the first coil 31 and the second coil 32 can be increased and generation of a short circuit between the first coil 31 and the second coil 32 can be suppressed.

Figure 2:
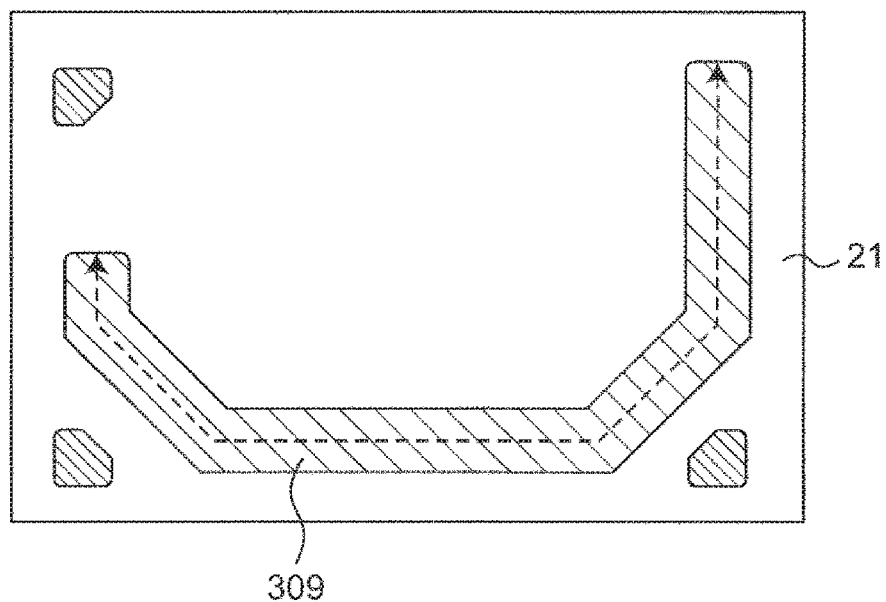
FIG. 2 is a schematic diagram for describing the length of a coil conductor layer.

In the multilayer coil array 1 according to this embodiment, the length of the coil conductor layer that contacts the non-magnetic layer 22 among the coil conductor layers constituting the coil conductor that contacts the non-magnetic layer 22 is different from the lengths of the other coil conductor layers. The coupling coefficient between the first coil and second coil can be changed by controlling the length of the coil conductor layers in this way. Here, "the length of a coil conductor layer" refers to the length in the winding direction of the coil. As illustrated in FIG. 2, the length of a coil conductor layer 309 that contacts the non-magnetic layer 22 is a value obtained by measuring the length of the coil conductor layer 309 along a portion of the coil conductor layer 309 that is substantially in the center (location at ½ the width) of the coil conductor layer 309 when the coil conductor layer 309 is viewed in the stacking direction. In addition, in the multilayer coil array 1 according to this embodiment, although it is sufficient that only the length of the coil conductor layer that contacts the non-magnetic layer 22 among the coil conductor layers constituting the coil conductor that contacts the non-magnetic layer 22 be made different from the lengths of the other coil conductor layers, alternatively the length of the entire coil conductor that contacts the non-magnetic layer 22 (that is, the length of all the coil conductor layers constituting the coil conductor) may be made different from the lengths of the other coil conductors. The coupling coefficient between the first coil and the second coil can be changed with this configuration as well.

It is preferable that the length of the coil conductor layer that contacts the non-magnetic layer 22 among the coil conductor layers that form the coil conductor that contacts the non-magnetic layer 22 be smaller than the length of the other coil conductor layers. It is possible to improve the coupling coefficient between the first coil and the second coil by making the length of the coil conductor layer that contacts the non-magnetic layer 22 small and filling the region where the coil conductor layer does not exist with a magnetic layer.

Outer Electrodes

The multilayer coil array 1 according to this embodiment includes the first outer electrode 401, the second outer electrode 402, the third outer electrode 403, and the fourth outer electrode 404 that are provided on a surface of the element body 2 and are respectively electrically connected to end portions of the first coil 31 and the second coil 32. In the configuration illustrated in FIG. 1A, the first outer electrode 401, the second outer electrode 402, the third outer electrode 403, and the fourth outer electrode 404 are provided on only the bottom surface of the element body 2, but the multilayer coil array according to this embodiment is not limited to this configuration, and the first to fourth outer electrodes 401 to 404 may instead be provided so as to extend from the bottom surface of the element body 2 onto other side surfaces that are adjacent to the bottom surface. For example, the first to fourth outer electrodes 401 to 404 may be substantially L-shaped electrodes that are provided so as to extend from the bottom surface of the element body 2 onto the WT surfaces that are adjacent to the bottom surface. The first to fourth outer electrodes 401 to 404 may be formed of an electrically conductive material such as Ag.

The outer electrodes may be each formed of a base electrode layer that contains Ag and one or more plating layers that are provided on the base electrode layer.

The thickness of each outer electrode is preferably 5-100 μm. The thickness of each outer electrode is more preferably 10-50 μm. Solder leaching and thermal shock resistance can be improved when the thickness of the outer electrodes is greater than or equal to 5 μm. When the thickness of the outer electrodes is less than or equal to 100 μm and more preferably less than or equal to 50 μm, sufficient volume is realized for the magnetic parts and therefore good electrical characteristics can be secured.

The thickness of the outer electrodes can be measured using the procedure described below. A test piece is ground down using the same method as described above, and an image of an outer electrode part is captured using an SEM. A measurement is taken at one place substantially in the center of the outer electrode in the captured SEM image and the obtained value is taken to be thickness of the outer electrodes.

The multilayer coil array according to the embodiment of the present disclosure can be suitably used as a coil component of a DC-DC converter.

A DC-DC converter according to an embodiment of the present disclosure includes the above-described multilayer coil array, a switching element, and a capacitor. The second outer electrode 402 and the fourth outer electrode 404 are connected to output terminals of the switching element. The first outer electrode 401 and the third outer electrode 403 are connected to a capacitor of a DC-DC converter.

The outer electrodes of the multilayer coil array at the side of the capacitor of the DC-DC converter are usually connected to the same line. Therefore, the potential difference between the adjacent coil conductors of two coils can be reduced and the generation of short circuits between the adjacent coil conductors can be suppressed by connecting the adjacent coil conductors of the two coils to the capacitor of the DC-DC converter as described above.

Method of Manufacturing Multilayer Coil Array

Figure 3P:
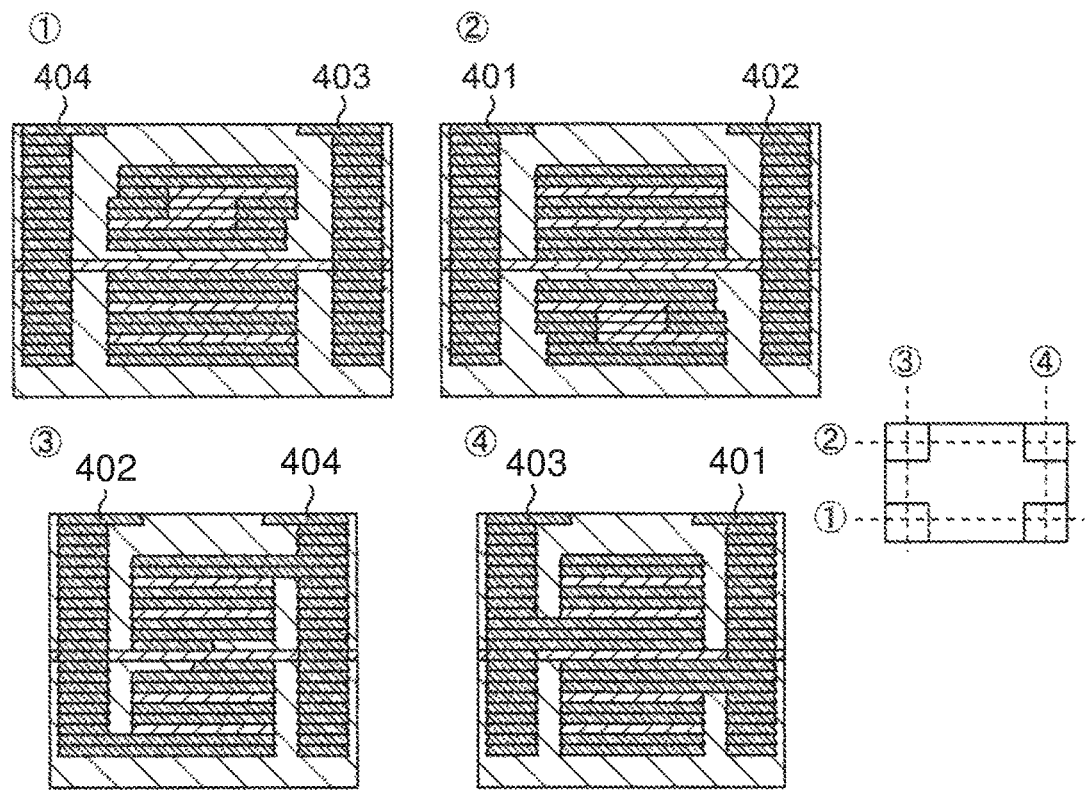
FIG. 3P is a schematic diagram for describing the method of manufacturing the multilayer coil array according to the embodiment of the present disclosure; \
Figure 3Q:
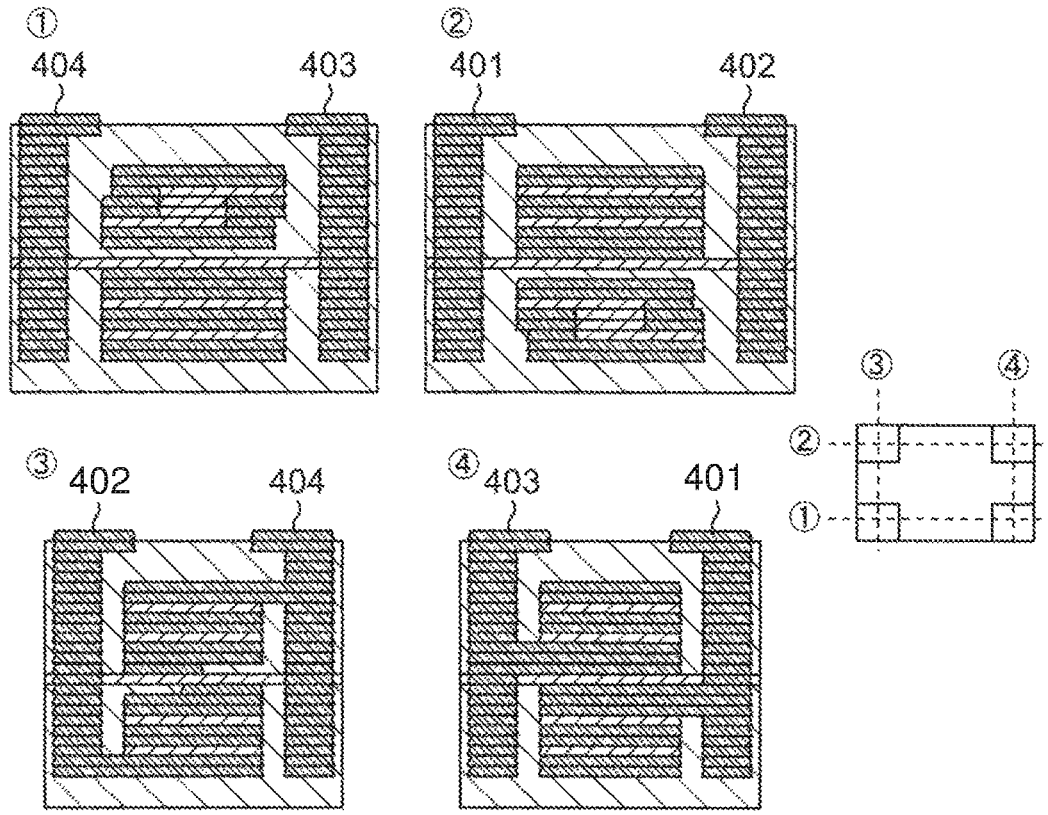
FIG. 3Q is a schematic diagram for describing the method of manufacturing the multilayer coil array according to the embodiment of the present disclosure; \

Next, a method of manufacturing the multilayer coil array 1 according to this embodiment will be described hereafter while referring to FIGS. 3A to 3S. The method of manufacturing the multilayer coil array 1 according to this embodiment is not limited to the method described below. In FIGS. 3A to 3S, the drawings on the right-hand side are plan views of a multilayer body during the various manufacturing processes and the remaining drawings are sectional views taken along broken lines 1 to 4 illustrated in the plan views.

First, in the procedure described hereafter, a multilayer body is prepared that has two coils (first coil 31 and second coil 32) formed inside thereof and that includes the magnetic layer 21. In FIGS. 3A to 3S, a multilayer body corresponding to one multilayer coil array is illustrated, but in the actual manufacturing method, a plurality of the multilayer coil arrays would be manufactured by molding a multilayer body corresponding to a plurality of multilayer coil arrays in an integrated manner and then dividing the multilayer body.

Preparation of Magnetic Paste

A magnetic paste is used to form the magnetic layer 21. The magnetic paste includes a magnetic material. The magnetic paste may include a binder, a solvent, a plasticizer, and so forth in addition to the magnetic material.

Magnetic Material

Particles composed of a metal magnetic material (metal magnetic particles) such as Fe, Co, Ni or an alloy including any of these metals or ferrite particles can be used as the magnetic material. The magnetic material is preferably Fe or an Fe alloy. Preferred Fe alloys include Fe—Si alloys, Fe—Si—Cr alloys, Fe—Si—Al alloys, Fe—Si—B—P—Cu—C alloys, and Fe—Si—B—Nb—Cu alloys. It is preferable that the surfaces of the metal magnetic particles composed of a metal magnetic material described above be covered with an insulating film. The degree of insulation between the metal magnetic particles can be increased when the surfaces of the metal magnetic particles are covered with an insulating film. A known sol gel method, mechanochemical method, and so on can be used as the method for forming the insulating film. The material forming the insulating film is preferably an oxide of P, Si, or the like. Furthermore, the insulating film may be an oxide film formed by oxidizing the surfaces of the metal magnetic particles. The thickness of the insulating film is preferably 1-50 nm, more preferably 1-30 nm, and still more preferably 1-20 nm. As described above, the thickness of the insulating film may be obtained by capturing an image using a scanning electron microscope (SEM) of a cross section obtained by grinding a multilayer coil array test piece and measuring the thickness of the insulating film on the surfaces of the metal magnetic particles from the obtained SEM image.

The average particle diameter of the metal magnetic particles is preferably 1-30 μm, more preferably 1-20 μm, and still more preferably 1-10 μm. Here, the "average particle diameter" of the metal particles of the raw material refers to a volume based median diameter ($D_{50}$).

ZnO powder is added to the above-described metal magnetic particles in an amount of around 0.2-2 wt % with respect to the total weight of the metal magnetic particles and the ZnO powder. In addition, the magnetic paste is prepared by adding and kneading predetermined amounts of a binder (such as ethyl cellulose resin), a solvent (such as terpineol), a plasticizer, and so on. The degree of insulation between the metal magnetic particles can be further increased by adding a predetermined amount of ZnO powder to the metal magnetic particles.

Preparation of Non-Magnetic Paste

A non-magnetic paste is used to form the non-magnetic layer 22 and the non-magnetic portion 23. The non-magnetic paste includes a non-magnetic material. The non-magnetic paste may include a binder, a solvent, a plasticizer, and so forth in addition to the non-magnetic material.

Non-Magnetic Material

A glass ceramic material, a non-magnetic ferrite material, and so forth can be used as the non-magnetic material, but it is preferable that a non-magnetic ferrite material be used. A non-magnetic ferrite material having a composition that contains 40-49.5 mol % of Fe in the form of $Fe_2O_3$, 6-12 mol % of Cu in the form of CuO, with the remainder consisting of ZnO can be used as the non-magnetic ferrite material. $Mn_3O_4$, $Co_3O_4$, $SnO_2$, $Bi_2O_3$, $SiO_2$, and so on may be added to the non-magnetic material as necessary as additives and the non-magnetic material may also contain trace amounts of unavoidable impurities.

$Fe_2O_3$, ZnO, CuO, and so on are weighed so as to be at a prescribed ratio, wet mixed and pulverized, and then dried. A non-magnetic ferrite material powder is prepared by calcining the obtained dried mixture at a temperature of 700-800° C. A non-magnetic paste is prepared by adding and kneading prescribed amounts of a solvent (such as a ketone solvent), a binder (such as a polyvinyl acetal resin), and a plasticizer (such as alkyd-based plasticizer) to the non-magnetic ferrite material.

Preparation of Electrically Conductive Paste

An electrically conductive paste is used to form the first coil 31 and the second coil 32, and the first to fourth outer electrodes 401 to 404. The electrically conductive paste includes an electrically conductive material such as Ag powder. The electrically conductive paste may include a solvent, a resin, a dispersant, and so forth in addition to the electrically conductive material.

The electrically conductive paste is prepared by preparing Ag powder, adding prescribed amounts of a solvent (such as eugenol (4-allyl-2-methoxyphenol)), a resin (such as ethyl cellulose), and a dispersant, and kneading the resulting mixture. Here, the average particle diameter of the Ag powder (volume-based median diameter $D_{50}$) is preferably 1-10 μm. The coils 31 and 32 and the first to fourth outer electrodes 401 to 404 may be formed using the same electrically conductive paste, or may be formed using electrically conductive pastes having different compositions.

Manufacture of Element Body 2

A thermal release sheet and a polyethylene terephthalate (PET) film are stacked on a metal plate, a magnetic paste is applied onto the top of the PET film, and the magnetic paste is then dried. The part of the magnetic layer 21 on the upper surface side of the multilayer coil array is formed by repeating the process of applying and drying the magnetic paste so that the magnetic paste comes to have a prescribed thickness.

A first coil conductor 301 of the first coil 31 is formed by applying the electrically conductive paste onto the above-described magnetic layer 21. At this time, connection portions 307, which are for leading the terminating ends of the coils out to the bottom surface, are also formed by applying the electrically conductive paste at prescribed positions outside the first coil conductor 301. After drying the applied electrically conductive paste, the magnetic paste is applied so as to fill the regions around the first coil conductor 301 and the connection portions 307 and the applied magnetic paste is then dried. The process of applying and drying the electrically conductive paste and the magnetic paste is repeated such that the first coil conductor 301 and the magnetic layer 21 surrounding the first coil conductor 301 come to have a prescribed thickness, and thus the first coil conductor 301 is formed with the surrounding regions being filled with the magnetic layer 21 (refer to FIG. 3A). In the example illustrated in FIG. 3A, the process of applying and drying the electrically conductive paste and the magnetic paste is repeated two times.

The connection portions formed in the step illustrated in FIG. 3A do not directly contribute to connections between the terminating ends of the coils and the outer electrodes, but since the connection portions are provided at substantially symmetrical positions inside the element body 2, the difference between the shrinkage percentages of the different parts of the element body 2 can be made small when the connection portions illustrated in FIG. 3A are formed.

Next, a non-magnetic portion 23 is formed by applying the non-magnetic paste onto the top of the first coil conductor 301 except for in a region where a connection layer 308, which is for forming a connection to a second coil conductor 302 of the first coil 31, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3B).

Also, n layers of coil conductors forming the first coil 31 and n−1 layers of the connection layer 308 that is connected to the adjacent coil conductor are repeatedly stacked (n is an integer greater than or equal to 2) using the same procedure as described above. In the manufacturing example illustrated in FIGS. 3A to 3S, the second coil conductor 302 is formed by applying the electrically conductive paste on top of the above-described non-magnetic portion. At this time, the terminating end of the second coil conductor 302 extends up to the connection layer 308 and is connected to the first coil conductor 301 via the connection layer 308. Furthermore, at the same time, the electrically conductive paste is also applied at the positions where the connection portions 307 are to be formed. Next, a non-magnetic portion 23 is formed by applying the non-magnetic paste between the starting end and the terminating end of the second coil conductor 302. The magnetic paste is applied so as to fill the regions around the second coil conductor 302, the connection portions 307, and the non-magnetic portion 23 and the magnetic paste is then dried. The above-described procedure is repeated and the second coil conductor 302 is formed with the surrounding regions being filled with the magnetic layer 21 so that the second coil conductor 302 comes to have a prescribed thickness (FIG. 3C).

Next, a non-magnetic portion 23 is formed by applying the non-magnetic paste onto the top of the second coil conductor 302 except for in a region where a connection layer 308, which is for forming a connection to a third coil conductor 303 of the first coil 31, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3D).

Next, the third coil conductor 303 is formed by applying the electrically conductive paste on top of the non-magnetic portion 23. At this time, the terminating end of the third coil conductor 303 extends up to the connection layer 308 and is connected to the second coil conductor 302 via the connection layer 308. Furthermore, at the same time, the electrically conductive paste is also applied at the positions where the connection portions 307 are to be formed. The magnetic paste is applied so as to fill the regions around the third coil conductor 303 and the connection portions 307 and the magnetic paste is then dried. The above-described procedure is repeated so that the third coil conductor 303 comes to have a prescribed thickness (FIG. 3E). At this time, as illustrated in FIG. 3F, the length of the coil conductor layer that is formed last among the coil conductor layers constituting the third coil conductor 303 (that is, the coil conductor layer that will contact the non-magnetic layer 22) may be given a length that is different from the lengths of the other coil conductor layers. In the manufacturing example illustrated in FIGS. 3A to 3S, the length of the coil conductor layer that is formed last is made smaller than the lengths of the other coil conductor layers. Thus, the third coil conductor 303 is formed with the surrounding regions being filled with the magnetic layer 21.

The first coil 31 is formed in which the first to third coil conductors 301 to 303 are connected to each other via the connection layers 308 through the above-described procedure. In the manufacturing example illustrated in FIGS. 3A to 3S, the number of turns of the first coil is three, but a multilayer coil array according to an embodiment of the present disclosure is not limited to this example and the number of turns may be appropriately changed as needed.

Next, the electrically conductive paste is applied at the positions where the connection portions 307 are to be formed and the non-magnetic layer 22 is formed by applying the magnetic paste in the region around the connection portions 307 (FIG. 3G). The process of applying and drying the electrically conductive paste and the non-magnetic paste is repeated so that the non-magnetic layer 22 comes to have a prescribed thickness.

Next, the second coil 32 is formed using the procedure described below. First, a fourth coil conductor 304 of the second coil 32 is formed by applying the electrically conductive paste onto the non-magnetic layer 22. Furthermore, the electrically conductive paste is also applied at the positions where the connection portions 307 are to be formed. The magnetic paste is applied so as to fill the regions around the fourth coil conductor 304 and the connection portions 307 and the magnetic paste is then dried. The above-described procedure is repeated so that the fourth coil conductor 304 comes to have a prescribed thickness (FIGS. 3H and 3I). At this time, as illustrated in FIG. 3H, the length of the coil conductor layer that is formed first among the coil conductor layers constituting the fourth coil conductor 304 (that is, the coil conductor layer that will contact the non-magnetic layer 22) may be given a length that is different from the lengths of the other coil conductor layers. In the manufacturing example illustrated in FIGS. 3A to 3S, the length of the coil conductor layer that is formed first is made smaller than the lengths of the other coil conductor layers. Thus, the fourth coil conductor 304 is formed with the surrounding regions being filled with the magnetic layer 21.

Next, a non-magnetic portion 23 is formed by applying the non-magnetic paste onto the top of the fourth coil conductor 304 except for in a region where a connection layer 308, which is for forming a connection to a fifth coil conductor 305 of the second coil 32, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3J).

Next, the fifth coil conductor 305 is formed by applying the electrically conductive paste on top of the non-magnetic portion 23. At this time, the terminating end of the fifth coil conductor 305 extends up to the connection layer 308 and is connected to the fourth coil conductor 304 via the connection layer 308. Furthermore, at the same time, the electrically conductive paste is also applied at the positions where the connection portions 307 are to be formed. The magnetic paste is applied so as to fill the regions around the fifth coil conductor 305 and the connection portions 307 and the magnetic paste is then dried. The above-described procedure is repeated so that the fifth coil conductor 305 comes to have a prescribed thickness (FIG. 3K). Thus, the fifth coil conductor 305 is formed with the surrounding regions being filled with the magnetic layer 21.

Next, a non-magnetic portion 23 is formed by applying the non-magnetic paste onto the top of the fifth coil conductor 305 except for in a region where a connection layer 308, which is for forming a connection to a sixth coil conductor 306 of the second coil 32, is to be formed. Next, the connection layer 308 is formed by applying the electrically conductive paste onto the above-described region where the non-magnetic paste was not applied. Furthermore, the electrically conductive paste is also applied at the positions where the connection portions 307 are to be formed. The magnetic paste is applied so as to fill the regions around the thus-formed non-magnetic portion 23, connection layer 308, and connection portions 307, and the applied magnetic paste is then dried. The above-described procedure is repeated so that the connection layer 308 comes to have a prescribed thickness (FIG. 3L).

Next, the sixth coil conductor 306 is formed by applying the electrically conductive paste on top of the non-magnetic portion 23. At this time, the terminating end of the sixth coil conductor 306 extends up to the connection layer 308 and is connected to the fifth coil conductor 305 via the connection layer 308. Furthermore, at the same time, the electrically conductive paste is also applied at the positions where the connection portions 307 are to be formed. The magnetic paste is applied so as to fill the regions around the sixth coil conductor 306 and the connection portions 307 and the magnetic paste is then dried. The above-described procedure is repeated so that the sixth coil conductor 306 comes to have a prescribed thickness (FIG. 3M). Thus, the sixth coil conductor 306 is formed with the surrounding regions being filled with the magnetic layer 21.

The second coil 32 is formed in which the fourth to sixth coil conductors 304 to 306 are connected to each other via the connection layers 308 through the above-described procedure. In the manufacturing example illustrated in FIGS. 3A to 3S, the number of turns of the second coil 32 is three, but a multilayer coil array according to an embodiment of the present disclosure is not limited to this example and the number of turns may be appropriately changed as needed.

The connection portions 307 are formed that lead the starting ends and the terminating ends of the first coil 31 and the second coil 32 out to the bottom surface of the element body 2 and connect the starting ends and the terminating ends of the first coil 31 and the second coil 32 to the outer electrodes once the prescribed number of coil conductors have been formed using the above-described procedure. The electrically conductive paste is applied at the positions where the connection portions 307 are to be formed and is then dried. The magnetic paste is applied so as to fill the regions around the connection portions 307 and is then dried. The process of applying and drying the electrically conductive paste and the magnetic paste is repeated so that the connection portions 307 come to have a prescribed thickness (FIG. 3N). When the connection portions 307 are formed in this way, an additional non-magnetic layer may be formed by applying the non-magnetic paste instead of the magnetic paste in any of the layers among the plurality of layers of magnetic paste applied in the regions around the connection portions 307. There may be one or more such additional non-magnetic layers. The degree of insulation between a coil and the outer electrodes can be increased by providing an additional non-magnetic layer between the coil and the outer electrodes.

Figure 3R:
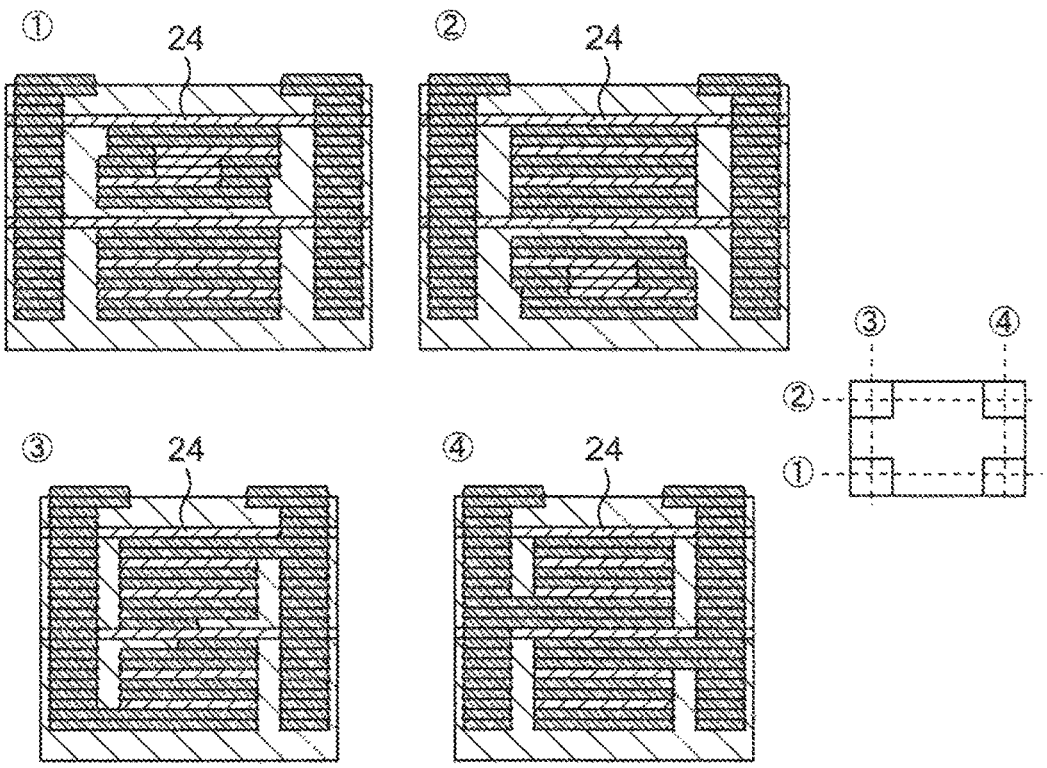
FIG. 3R is a schematic diagram for describing a modification of the method of manufacturing the multilayer coil array according to the embodiment of the present disclosure.
Figure 3S:
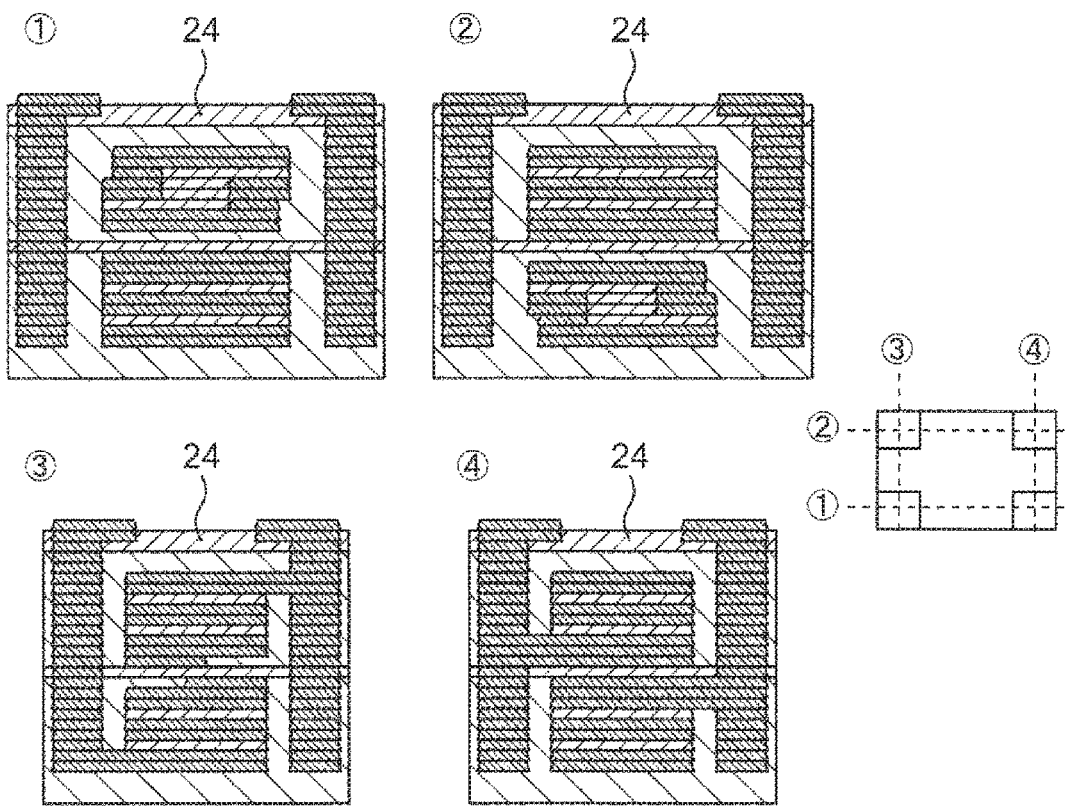
FIG. 3S is a schematic diagram for describing another modification of the method of manufacturing the multilayer coil array according to the embodiment of the present disclosure.

In one modification, as illustrated in FIG. 3R, an additional non-magnetic layer 24 may contact a coil conductor that faces the outer electrodes. When a coil conductor that faces the outer electrodes and an additional non-magnetic layer contact each other in this way, a direct-current superimposition characteristic of the multilayer coil array 1 can be further improved.

In another modification, as illustrated in FIG. 3S, the additional non-magnetic layer 24 may contact the outer electrodes. The direct-current resistance between the outer electrodes can be improved by providing the additional non-magnetic layer so that the additional non-magnetic layer contacts the outer electrodes.

In another modification, an additional non-magnetic layer may be provided at a position between a position where the additional non-magnetic layer would contact the coil conductor that faces the outer electrodes and a position where the non-magnetic layer would contact the outer electrodes. Improvement of the direct-current superimposition characteristic and improvement of direct-current resistance between the outer electrodes can be achieved in a well balanced manner by providing an additional non-magnetic layer at such a position.

A multilayer body inside of which a coil is formed and that includes a magnetic layer is prepared using the above-described procedure.

Next, the outer electrodes are formed. First, first outer electrode layers of the first outer electrode 401, the second outer electrode 402, the third outer electrode 403, and the fourth outer electrode 404 are formed by applying conductive paste onto a surface of the multilayer body obtained by the above-described procedure (FIG. 3O). The surface of the multilayer body on which the outer electrodes are formed is a surface that corresponds to a bottom surface of the element body. Four outer electrode patterns are formed by applying the electrically conductive paste so as to respectively cover the connection portions 307 exposed at the surface of the multilayer body and then the outer electrode patterns are dried.

Next, a magnetic paste layer or a non-magnetic paste layer is formed by applying a magnetic paste or a non-magnetic paste so as to cover at least part of an outer edge portion of each first outer electrode layer (FIG. 3P). At this time, the magnetic paste or non-magnetic paste is applied so as to fill the region surrounding the first outer electrode layers and then dried. In the example illustrated in FIG. 3P, a magnetic paste layer is formed. The degree of close contact between the element body and the outer electrodes can be improved by applying a magnetic paste or a non-magnetic paste in this way.

Next, second outer electrode layers of the first to fourth outer electrodes 401 to 404 are formed by applying a conductive paste onto the first outer electrode layers. The second outer electrode layers are formed so that part of each second outer electrode layer covers at least part of an outer edge portion of the magnetic paste layer or the non-magnetic paste layer (FIG. 3Q). The degree of close contact between the outer electrodes and the element body can be improved by forming the first to fourth outer electrodes 401 to 404 in this way. In addition, as a result of the second outer electrode layers being the outermost layers of the multilayer body, the outermost surfaces of the outer electrodes are located further toward the outside than the bottom surface of the element body at the bottom surface of the element body of the obtained multilayer coil array. Consequently, both improvement of the degree of close contact between the element body and the outer electrodes and improvement of contact at the time of mounting can be achieved for the obtained multilayer coil array.

In the manufacturing example illustrated in FIGS. 3A to 3S, the first to fourth outer electrodes 401 to 404 are formed by stacking two outer electrode layers (first outer electrode layer and second outer electrode layer), but a multilayer coil array according to an embodiment of the present disclosure and a manufacturing method therefor are not limited to this example, and the outer electrodes may instead be formed by stacking three or more outer electrode layers. In the case where n outer electrode layers are stacked (n is an integer greater than or equal to 3), a process of applying and then drying the electrically conductive paste and the magnetic paste or non-magnetic paste as described above is repeated n−1 times, and then finally the n-th outer electrode layer is formed by applying and then drying the conductive paste. Thus, the outermost surfaces of the outer electrodes are located further toward the outside than the bottom surface of the element body in the multilayer coil array obtained by stacking the layers such that the outermost layer of the multilayer body consists of the outer electrode layers.

The thus-obtained multilayer body is heated and separated from the metal plate, is then subjected to pressure bonding, and the PET film is then separated from the multilayer body. Thus, the multilayer body, which is an agglomeration of the element bodies, is obtained.

Next, the obtained multilayer body is divided into individual element bodies by performing cutting using a dicer. Corner portions of each divided multilayer body are rounded by subjecting the divided multilayer bodies to barrel processing. The barrel processing may be performed prior to firing the multilayer bodies or the barrel processing may be performed after the element bodies have been fired. The method used to perform the barrel processing may be a dry process or a wet process, a method in which the multilayer bodies rub against each other, or a method in which the multilayer bodies are barrel processed together with a medium.

Next, the barrel processed multilayer bodies are fired. The multilayer bodies are placed in a firing furnace and fired at a temperature of 650-750° C. and element bodies having the outer electrodes provided on the bottom surfaces thereof are thus obtained. The fired element bodies are immersed in a resin (such as epoxy resin) in a vacuum environment of 1 Pa or less and the insides of the element bodies are impregnated with the resin. The resin-impregnated element bodies are washed with a solvent (such as butyl carbitol acetate (2-(2-butoxyethoxy) ethyl acetate)), allowed to dry naturally, and then the resin is cured at a temperature of 100-200° C. After that, a Ni plating layer and a Sn plating layer are formed on the outer electrodes (base electrodes) formed on the surface of the element bodies by performing electroless plating. Thus, the multilayer coil array 1 illustrated in FIGS. 1A and 1B is obtained.

A method of manufacturing a multilayer coil array having two coils built into the inside of an element body thereof has been described above, but the multilayer coil array according to this embodiment may instead include three or more coils and in such a case, the multilayer coil array can be manufactured using a similar procedure to that described above. Furthermore, in the multilayer coil array according to this embodiment, the first coil 31 and the second coil 32 are each formed by connecting three coil conductors to each other, but each coil may instead be formed by connecting two coil conductors or four or more coil conductors to each other.

The present disclosure includes but is not limited to the following modes.

Mode 1

A DC-DC converter multilayer coil array including an element body that includes a magnetic layer containing magnetic particles; a first coil and a second coil that are built into the element body; and a first outer electrode, a second outer electrode, a third outer electrode, and a fourth outer electrode that are provided on a surface of the element body and are respectively electrically connected to end portions of the first coil and the second coil. A non-magnetic layer is provided between the first coil and the second coil.

The first coil and the second coil are each formed by a plurality of coil conductors being connected to each other in a stacking direction. An end portion of the first coil that extends from the coil conductor that is closest to the second coil among the plurality of coil conductors of the first coil is connected to the first outer electrode and another end portion of the first coil is connected to the second outer electrode. An end portion of the second coil that extends from the coil conductor that is closest to the first coil among the plurality of coil conductors of the second coil is connected to the third outer electrode and another end portion of the second coil is connected to the fourth outer electrode. The second outer electrode and the fourth outer electrode are connected to output terminals of a switching element of a DC-DC converter.

Mode 2

A DC-DC converter including the multilayer coil array described in mode 1, a switching element, and a capacitor, in which the second outer electrode and the fourth outer electrode are connected to output terminals of the switching element. The first outer electrode and the third outer electrode are connected to a capacitor of the DC-DC converter. A multilayer coil array according to an embodiment of the present disclosure can be used in a wide range of applications such as a DC-DC converter.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A DC-DC converter comprising:
two switching elements;
a capacitor; and
a DC-DC converter multilayer coil array comprising:
an element body that includes a magnetic layer containing magnetic particles;
a first coil and a second coil that are built into the element body;
a first outer electrode, a second outer electrode, a third outer electrode, and a fourth outer electrode that are provided on a surface of the element body and are respectively electrically connected to end portions of the first coil and the second coil; and
a non-magnetic layer between the first coil and the second coil, wherein
  the first coil and the second coil are each formed by a plurality of coil conductors being connected to each other in a stacking direction,
  an end portion of the first coil that extends from the coil conductor that is closest to the second coil among the plurality of coil conductors of the first coil is connected to the first outer electrode and another end portion of the first coil is connected to the second outer electrode,
  an end portion of the second coil that extends from the coil conductor that is closest to the first coil among the plurality of coil conductors of the second coil is connected to the third outer electrode and another end portion of the second coil is connected to the fourth outer electrode,
  the second outer electrode is connected to an output terminal of one of the two switching elements, and the fourth outer electrode is connected to an output terminal of the other of the two switching elements, and
  the first outer electrode and the third outer electrode are connected to the capacitor of the DC-DC converter.

2. The DC-DC converter according to claim 1, wherein
  a length of the coil conductor of the first coil that contacts the non-magnetic layer is different from lengths of all other of the coil conductors of the first coil; and
  a length of the coil conductor of the second coil that contacts the non-magnetic layer is different from lengths of all other of the coil conductors of the second coil.

3. The DC-DC converter according to claim 2, wherein
  the length of the coil conductor of the first coil that contacts the non-magnetic layer is smaller than the lengths of the all other of the coil conductors of the first coil; and
  the length of the coil conductor of the second coil that contacts the non-magnetic layer is smaller than the lengths of the all other of the coil conductors of the second coil.

4. The DC-DC converter according to claim 1, wherein
  a coil conductor pattern of the first coil that is located away from the non-magnetic layer and away from the second coil is connected to the second outer electrode,
  a coil conductor pattern of the second coil that is located away from the non-magnetic layer and away from the first coil is connected to the fourth outer electrode.

5. The DC-DC converter according to claim 1, wherein the second coil is positioned directly between the first coil and the surface.

6. A DC-DC converter comprising:
  two switching elements;
  a capacitor; and
  a DC-DC converter multilayer coil array comprising:
    an element body that includes a magnetic layer containing magnetic particles;
    a first coil and a second coil that are built into the element body;
    a first outer electrode, a second outer electrode, a third outer electrode, and a fourth outer electrode that are provided on a surface of the element body and are respectively electrically connected to end portions of the first coil and the second coil; and
    a non-magnetic layer between the first coil and the second coil,
  wherein
    the first coil and the second coil are each formed by a plurality of coil conductors being connected to each other in a stacking direction,
    an end portion of the first coil that extends from the coil conductor that is closest to the second coil among the plurality of coil conductors of the first coil, the coil conductor of the first coil that is closest to the second coil being directly below the non-magnetic layer, is connected to the first outer electrode and another end portion of the first coil is connected to the second outer electrode,
    an end portion of the second coil that extends from the coil conductor that is closest to the first coil among the plurality of coil conductors of the second coil, the coil conductor of the second coil that is closest to the first coil being directly above the non-magnetic layer, is connected to the third outer electrode and another end portion of the second coil is connected to the fourth outer electrode,
    the second outer electrode is connected to an output terminal of one of the two switching elements, and the fourth outer electrode is connected to an output terminal of the other of the two switching elements, and
    the first outer electrode and the third outer electrode are connected to the capacitor of the DC-DC converter.

7. The DC-DC converter according to claim 6, wherein
  a length of the coil conductor of the first coil that contacts the non-magnetic layer is different from lengths of all other of the coil conductors of the first coil; and
  a length of the coil conductor of the second coil that contacts the non-magnetic layer is different from lengths of all other of the coil conductors of the second coil.

8. The DC-DC converter according to claim 7, wherein
  the length of the coil conductor of the first coil that contacts the non-magnetic layer is smaller than the lengths of the all other of the coil conductors of the first coil; and
  the length of the coil conductor of the second coil that contacts the non-magnetic layer is smaller than the lengths of the all other of the coil conductors of the second coil.

9. The DC-DC converter according to claim 6, wherein a coil conductor pattern of the first coil that is located away from the non-magnetic layer and away from the second coil is connected to the second outer electrode,
  a coil conductor pattern of the second coil that is located away from the non-magnetic layer and away from the first coil is connected to the fourth outer electrode.

10. The DC-DC converter according to claim 6, wherein the second coil is positioned directly between the first coil and the surface.

11. A DC-DC converter comprising:
  two switching elements;
  a capacitor; and
  a DC-DC converter multilayer coil array comprising:
    an element body that includes a magnetic layer containing magnetic particles;
    a first coil and a second coil that are built into the element body;
    a first outer electrode, a second outer electrode, a third outer electrode, and a fourth outer electrode that are provided on a surface of the element body and are respectively electrically connected to end portions of the first coil and the second coil; and a non-magnetic layer between the first coil and the second coil, wherein the first coil and the second coil are each formed by a plurality of coil conductors being connected to each other in a stacking direction, an end portion of the first coil that extends from the coil conductor that is closest to the second coil among the plurality of coil conductors of the first coil is connected to the first outer electrode and another end portion of the first coil, that is farthest from the surface among the plurality of coil conductors of the first coil, is connected to the second outer electrode, an end portion of the second coil that extends from the coil conductor that is closest to the first coil among the plurality of coil conductors of the second coil is connected to the third outer electrode and another end portion of the second coil is connected to the fourth outer electrode, the second outer electrode is connected to an output terminal of one of the two switching elements, and the fourth outer electrode is connected to an output terminal of the other of the two switching elements, and the first outer electrode and the third outer electrode are connected to the capacitor of the DC-DC converter.

12. The DC-DC converter according to claim 11, wherein
a length of the coil conductor of the first coil that contacts the non-magnetic layer is different from lengths of all other of the coil conductors of the first coil; and
a length of the coil conductor of the second coil that contacts the non-magnetic layer is different from lengths of all other of the coil conductors of the second coil.

13. The DC-DC converter according to claim 12, wherein
the length of the coil conductor of the first coil that contacts the non-magnetic layer is smaller than the lengths of the all other of the coil conductors of the first coil; and
the length of the coil conductor of the second coil that contacts the non-magnetic layer is smaller than the lengths of the all other of the coil conductors of the second coil.

14. The DC-DC converter according to claim 11, wherein
a coil conductor pattern of the first coil that is located away from the non-magnetic layer and away from the second coil is connected to the second outer electrode,
a coil conductor pattern of the second coil that is located away from the non-magnetic layer and away from the first coil is connected to the fourth outer electrode.

15. The DC-DC converter according to claim 11, wherein the second coil is positioned directly between the first coil and the surface.

* * * * *